(12) United States Patent
Suzuki et al.

(10) Patent No.: US 6,775,071 B1
(45) Date of Patent: Aug. 10, 2004

(54) IMAGE FORMING OPTICAL SYSTEM AND OPTICAL DEVICE USING THE SAME

(75) Inventors: Yoshimasa Suzuki, Kawasaki (JP); Tetsuhide Takeyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/413,561

(22) Filed: Apr. 15, 2003

(30) Foreign Application Priority Data

Mar. 4, 2003 (JP) ........................................ 2003-056596

(51) Int. Cl.$^7$ .............................................. G02B 15/14
(52) U.S. Cl. ........................ 359/686; 359/679; 359/683; 359/740; 359/779
(58) Field of Search ................................ 359/686, 679, 359/676, 683, 740, 779

(56) References Cited

U.S. PATENT DOCUMENTS

| | | | | | |
|---|---|---|---|---|---|
| 4,073,573 A | * | 2/1978 | Yamagishi | .................. | 359/705 |
| 4,836,661 A | * | 6/1989 | Ikemori | ..................... | 359/676 |
| 5,276,760 A | * | 1/1994 | Yokota | ........................ | 385/119 |
| 5,402,268 A | * | 3/1995 | Tatsuno | ...................... | 359/747 |
| 5,825,546 A | * | 10/1998 | Matsui | ....................... | 359/557 |

* cited by examiner

*Primary Examiner*—Evelyn A. Lester
(74) *Attorney, Agent, or Firm*—Kenyon & Kenyon

(57) ABSTRACT

An image forming optical system includes, comprises, in order from the object side toward the image side, a first lens unit with positive refracting power, a second lens unit with positive refracting power, a third lens unit with negative refracting power, a fourth lens unit with positive refracting power, and an aperture stop interposed between the third lens unit and the fourth lens unit. The image forming optical system has a variable magnification optical system in which spacings between these lens units are changed to vary the imaging magnification, changes the imaging magnification while constantly keeping the object-to-image distance of the image forming optical system, and in at least one variable magnification state where the imaging magnification is changed, satisfies the following conditions:

$|En|/L > 0.4$ $|Ex|/|L/\beta| > 0.4$ where $En$ is a distance from a first lens surface on the object side of the variable magnification optical system to the entrance pupil of the image forming optical system, $L$ is the object-to-image distance of the image forming optical system, $Ex$ is a distance from the last lens surface on the image side of the variable magnification optical system to the exit pupil of the image forming optical system, and $\beta$ is the magnification of the whole of the image forming optical system.

17 Claims, 20 Drawing Sheets

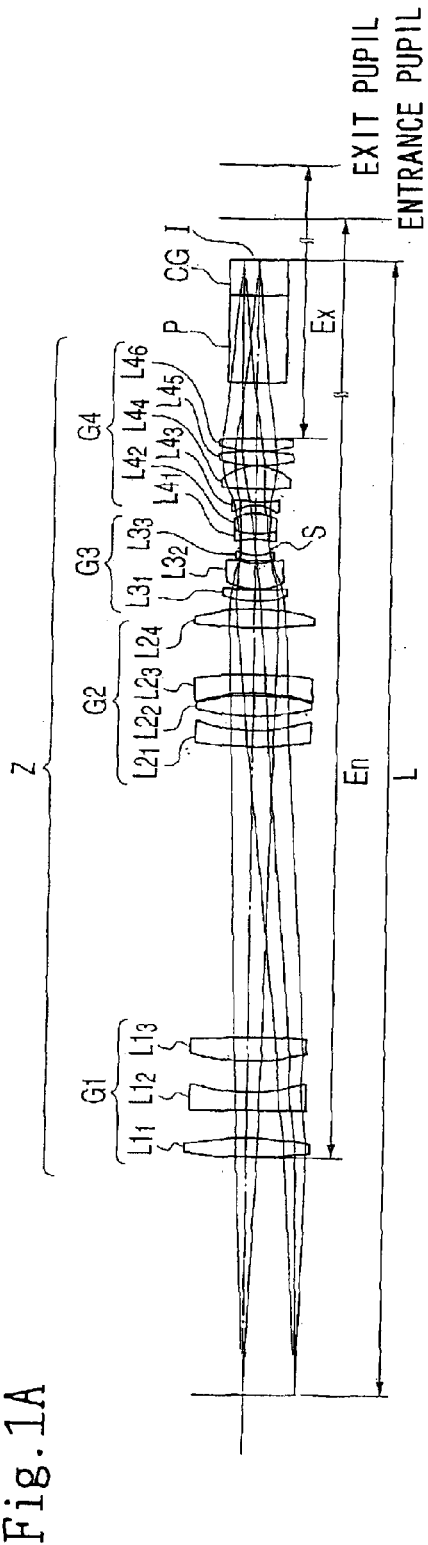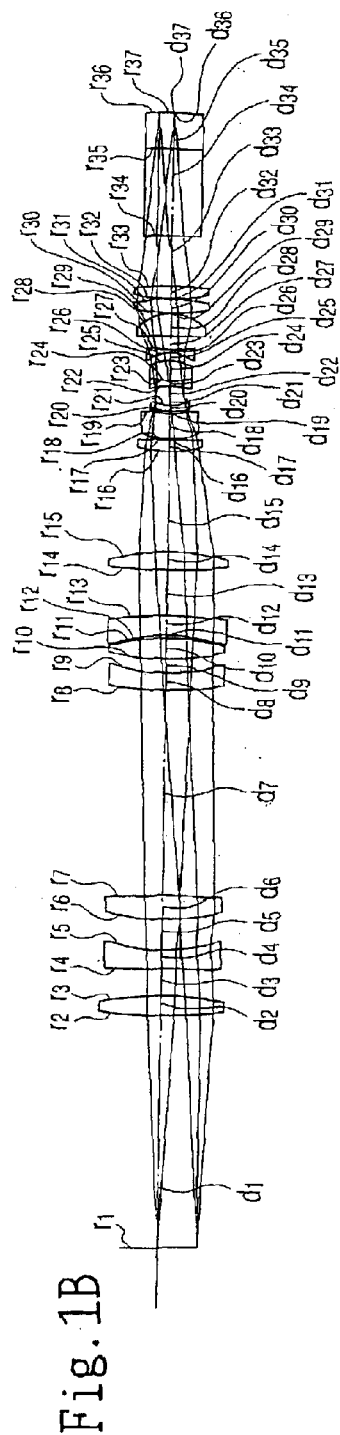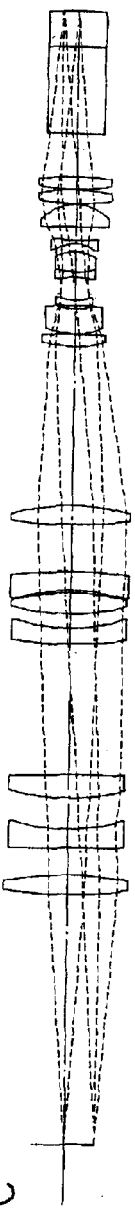
Fig.1A
Fig.1B
Fig.1C

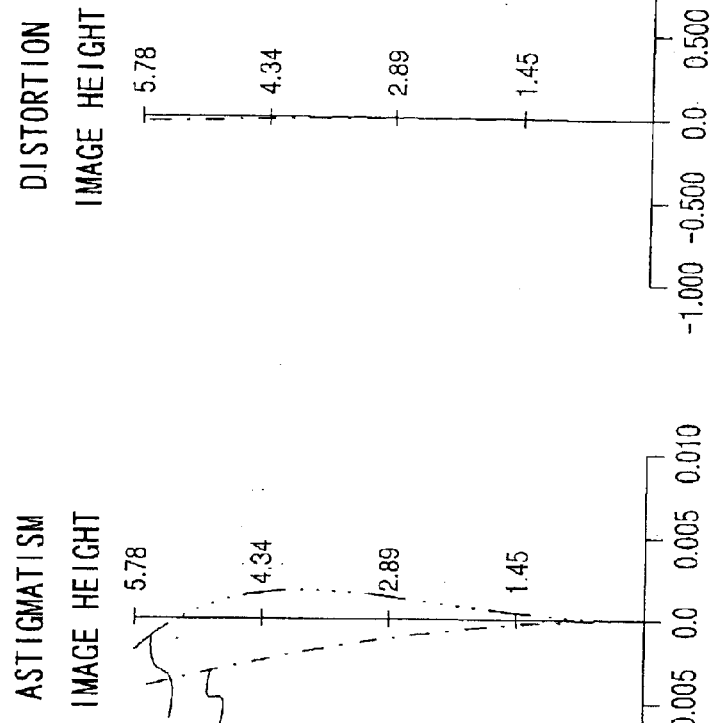
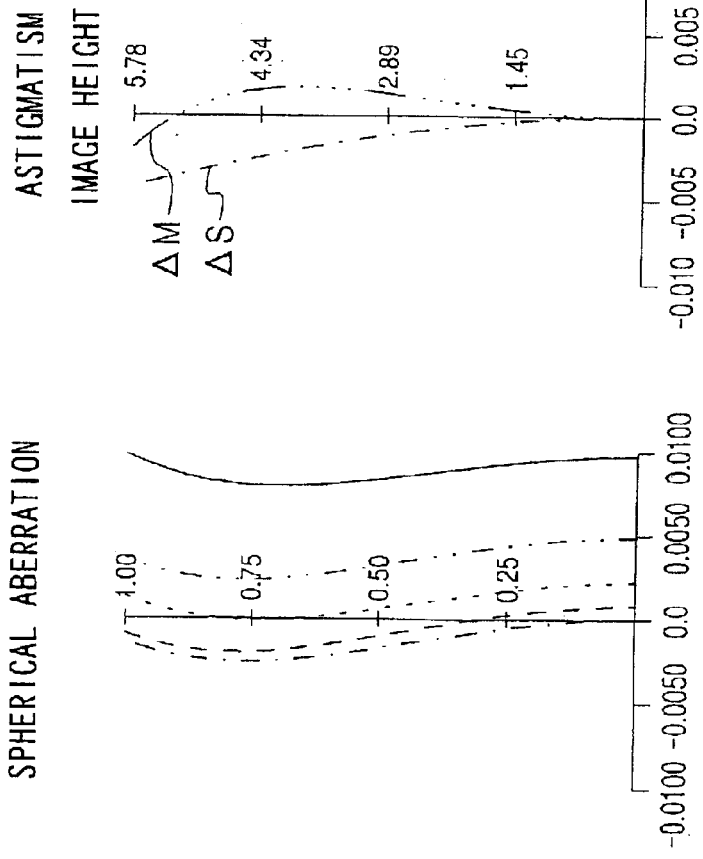

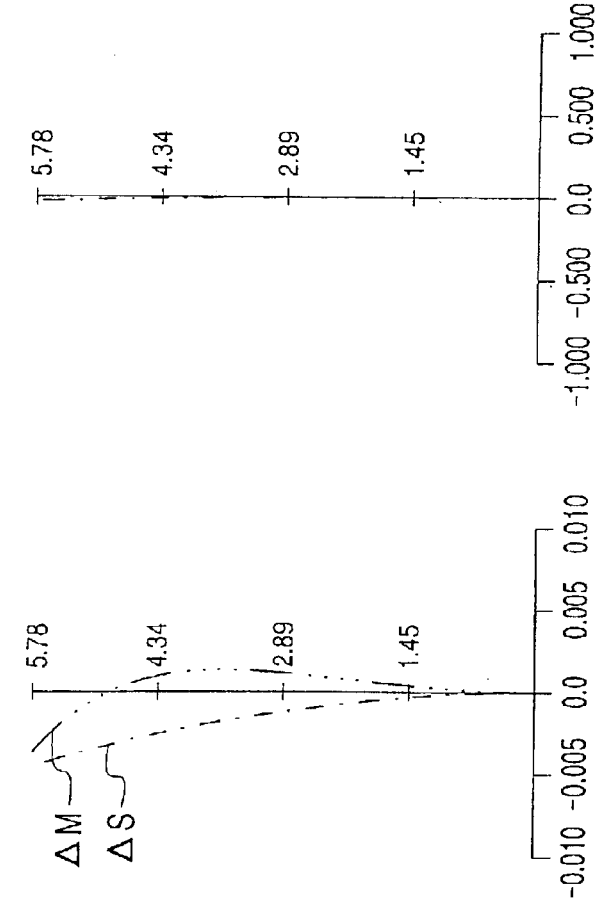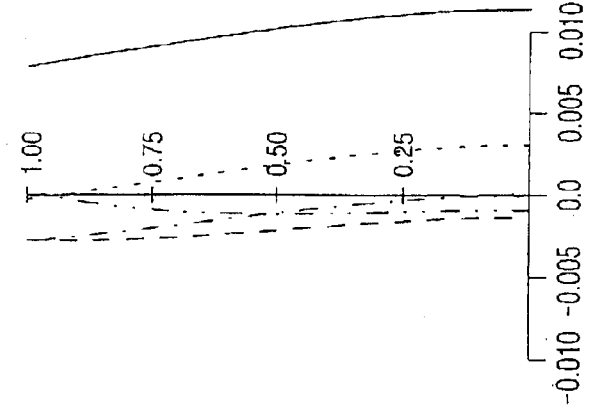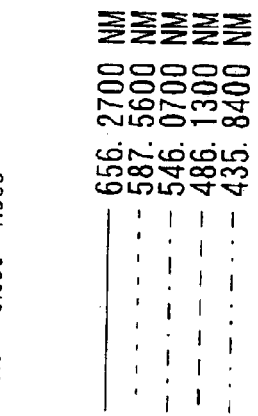

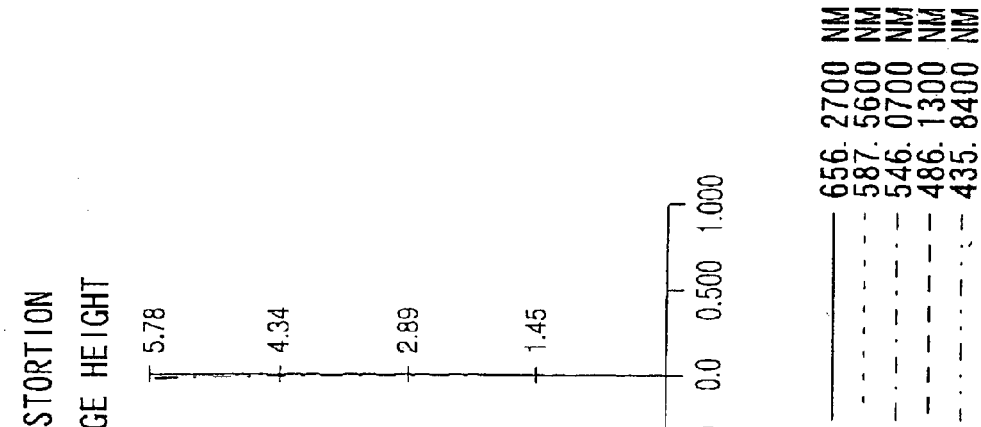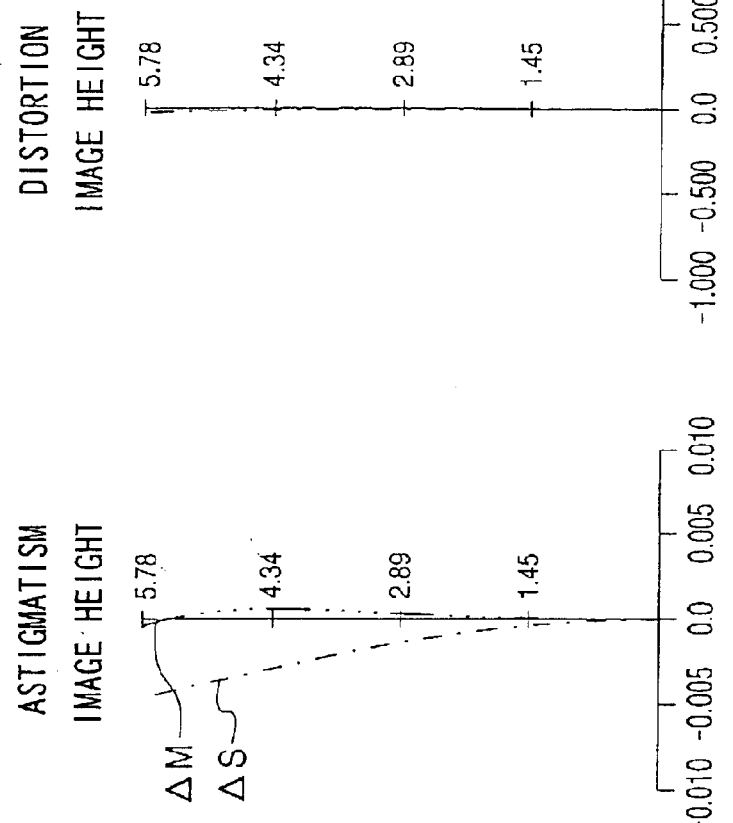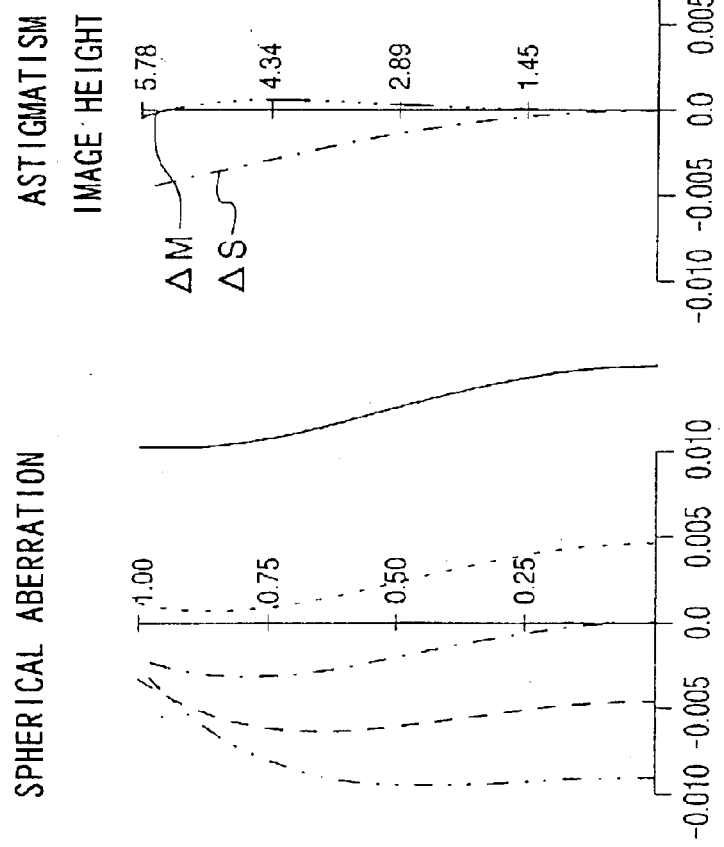

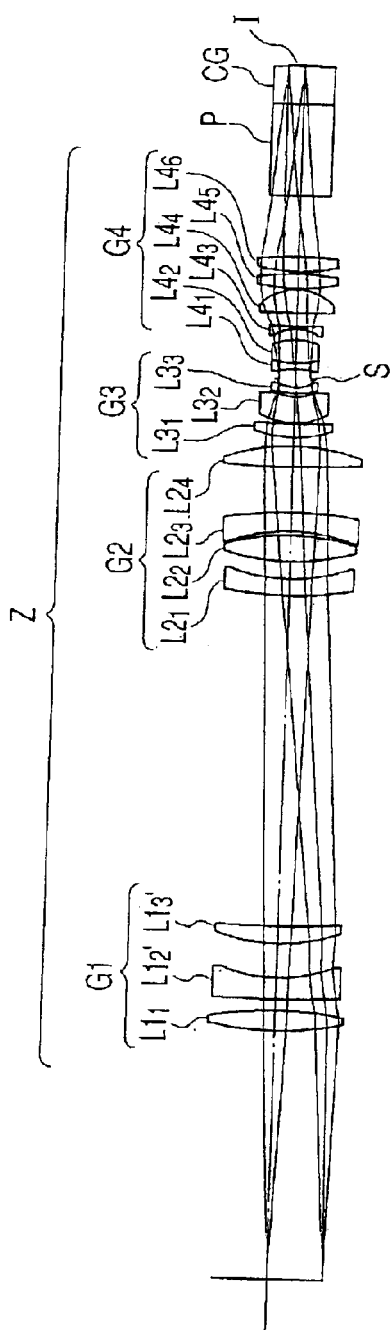
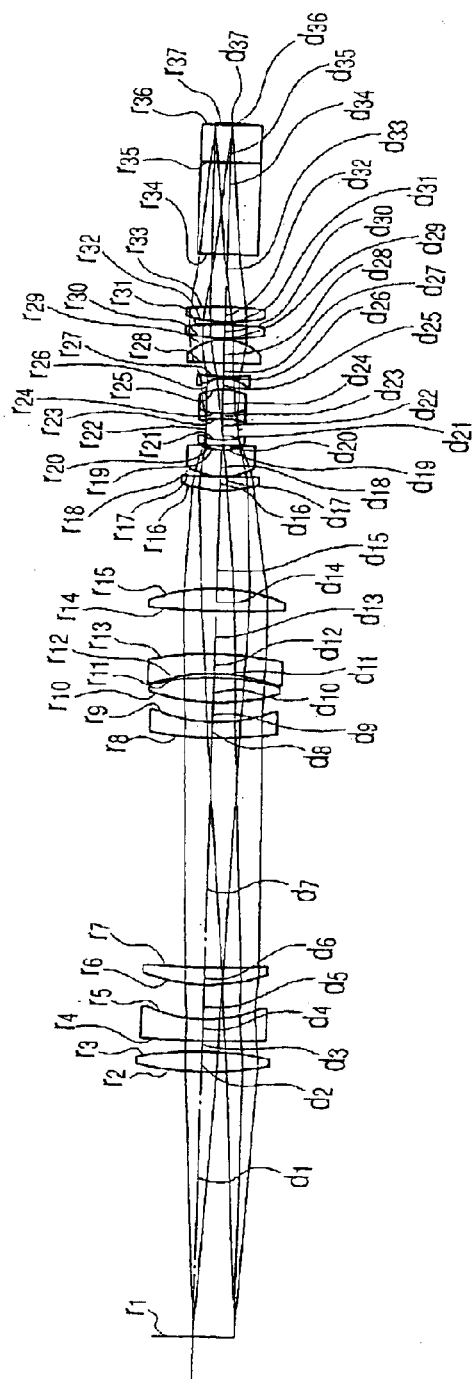
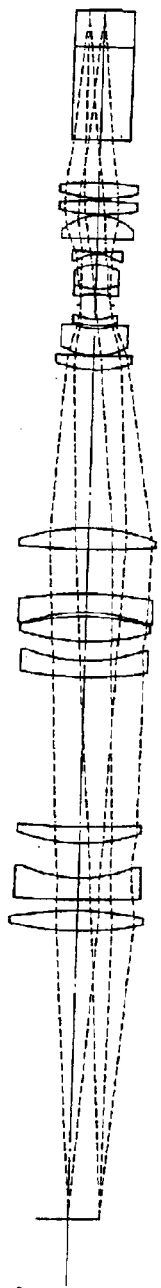
Fig.7A
Fig.7B
Fig.7C

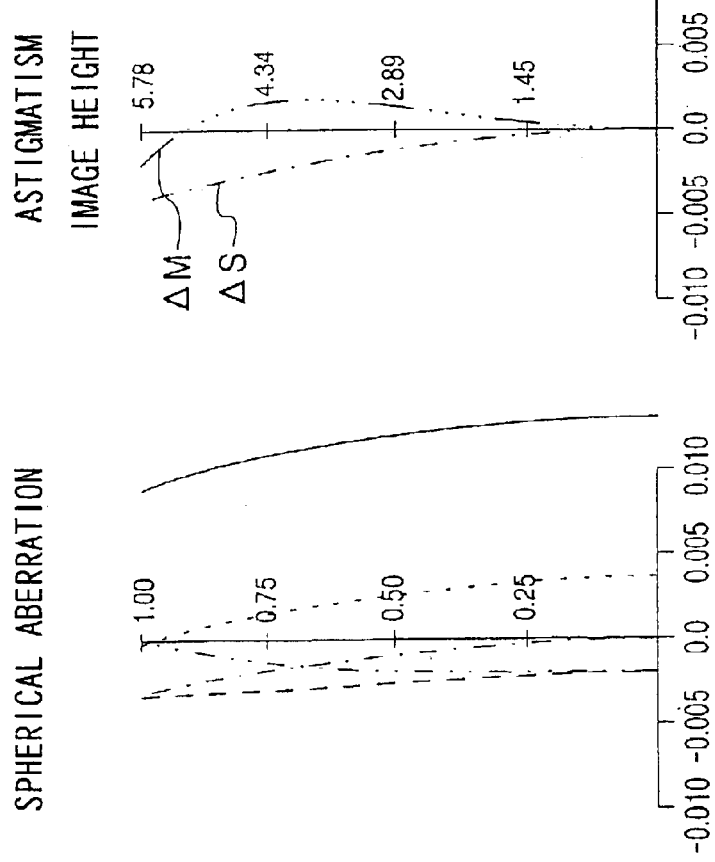

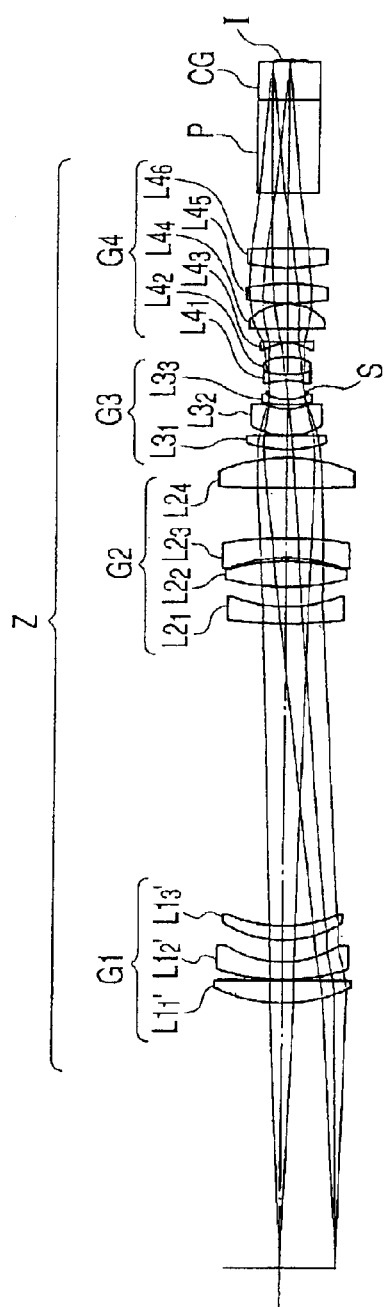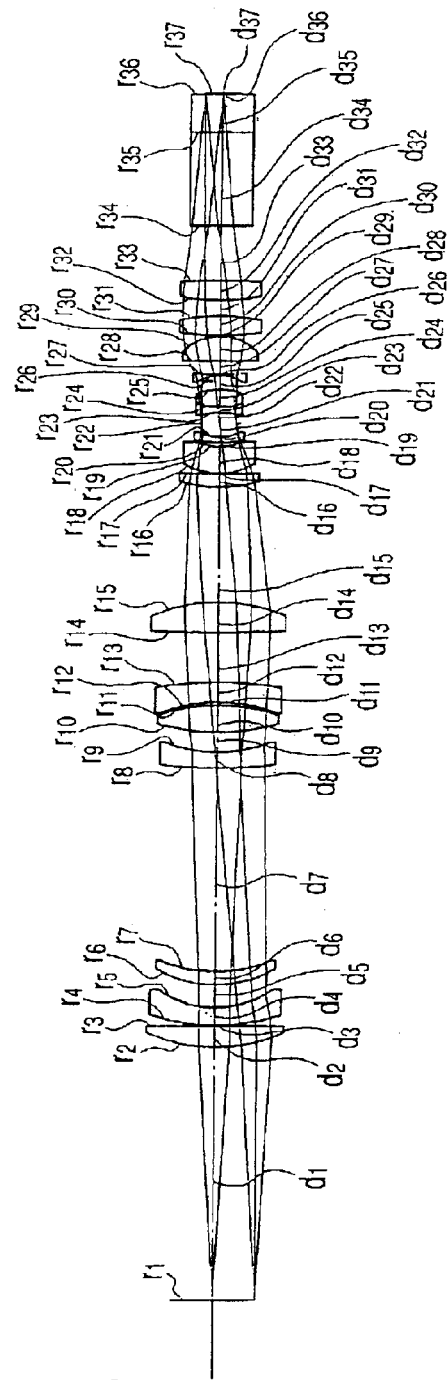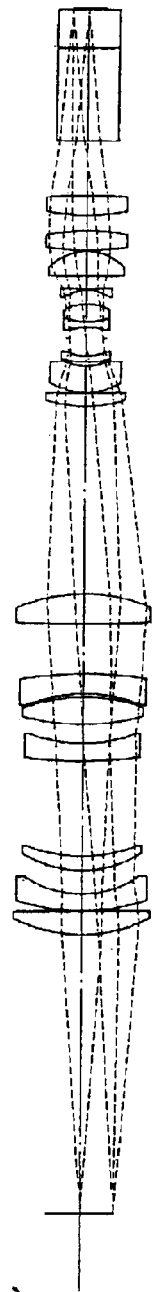
Fig. 9A
Fig. 9B
Fig. 9C

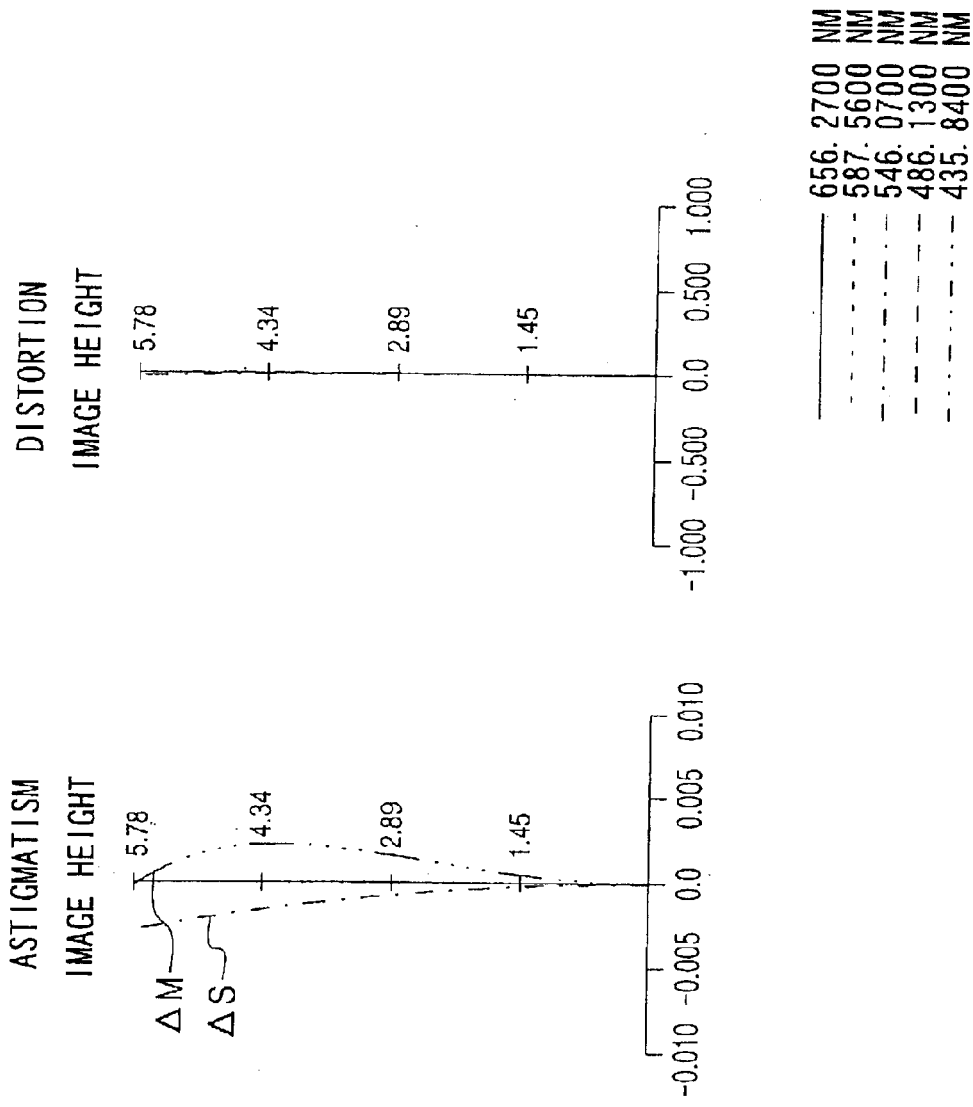

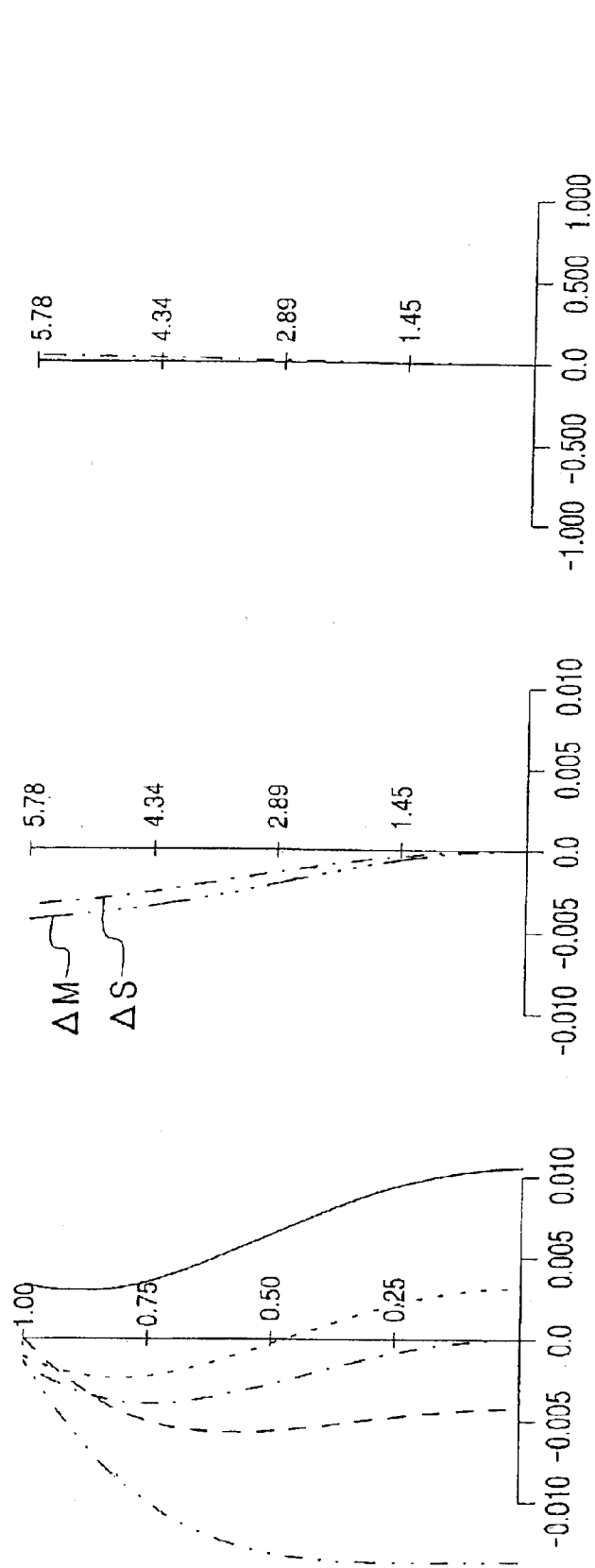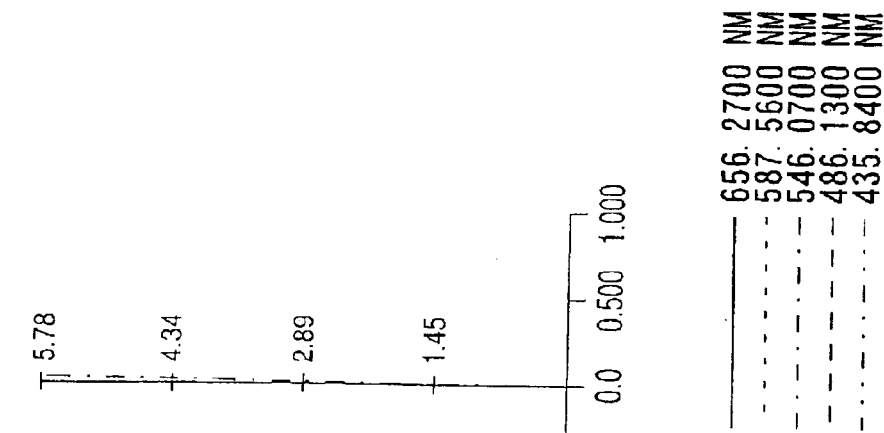

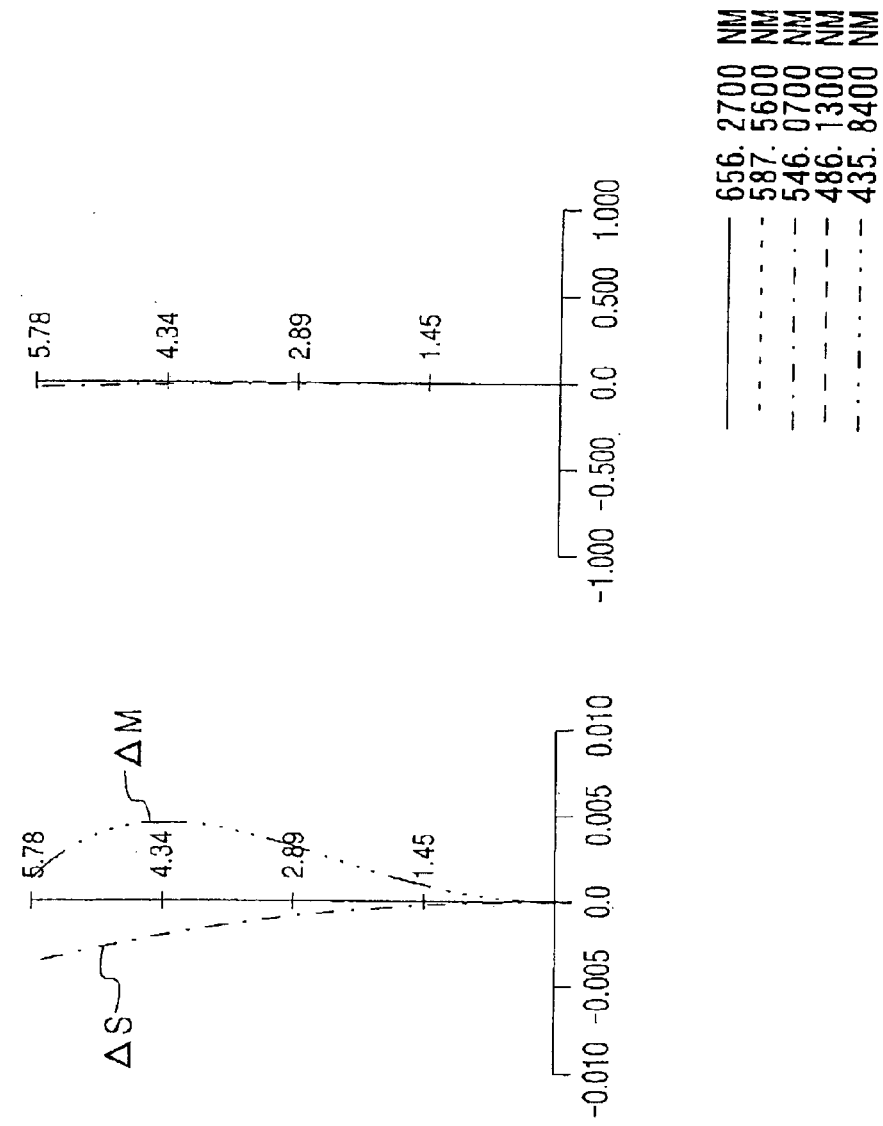
Fig.14A SPHERICAL ABERRATION
Fig.14B ASTIGMATISM IMAGE HEIGHT
Fig.14C DISTORTION IMAGE HEIGHT
656.2700 NM
587.5600 NM
546.0700 NM
486.1300 NM
435.8400 NM

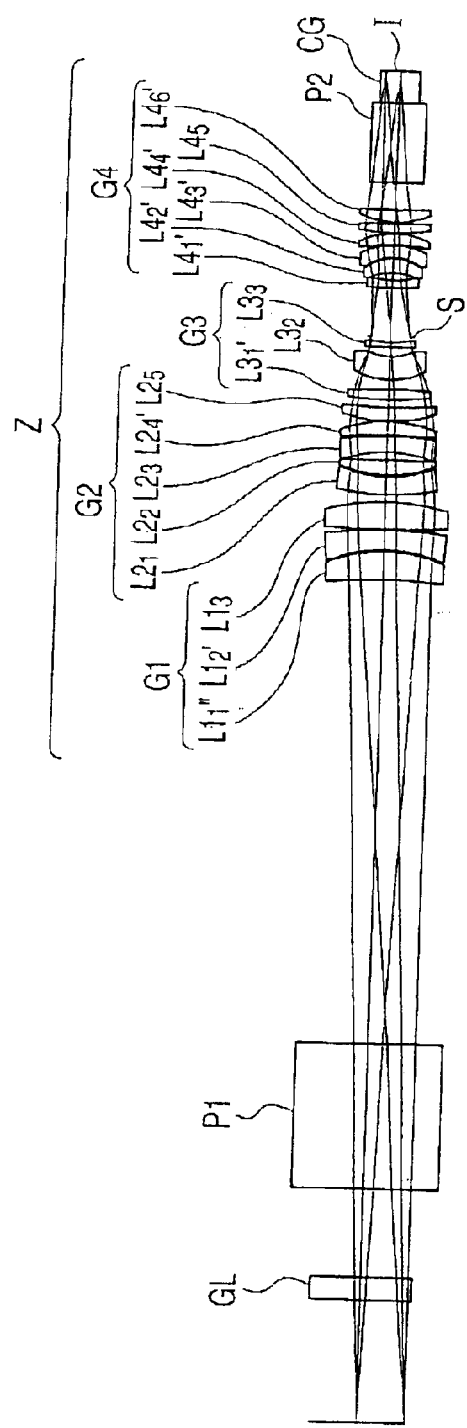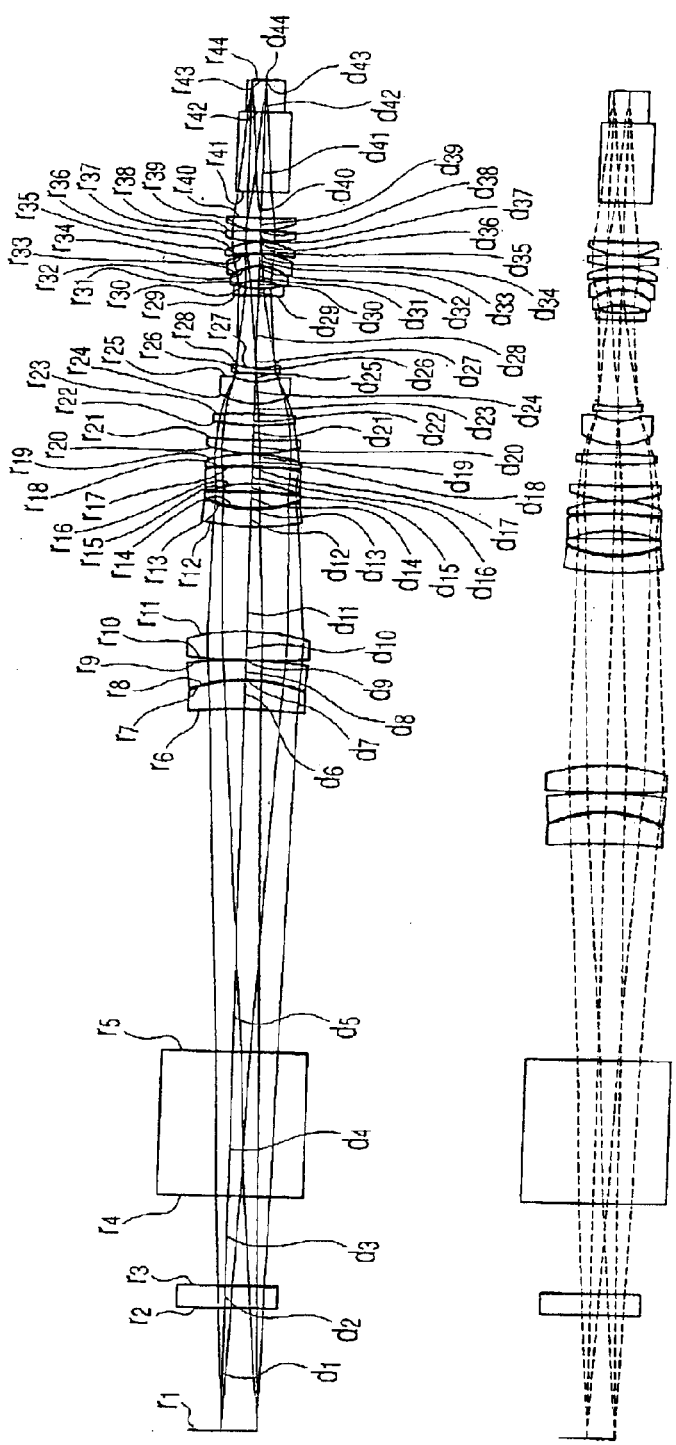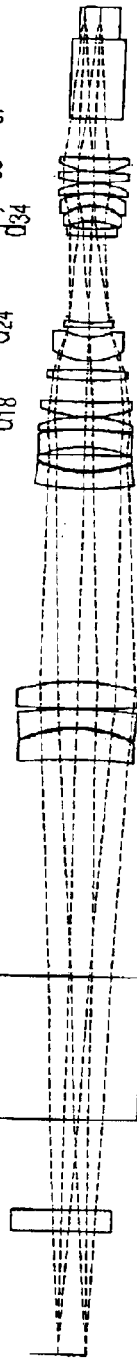
Fig.15A
Fig.15B
Fig.15C

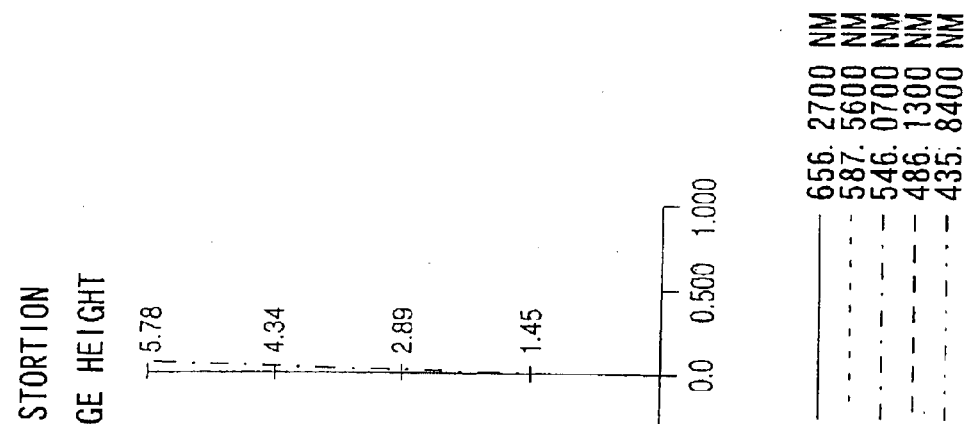
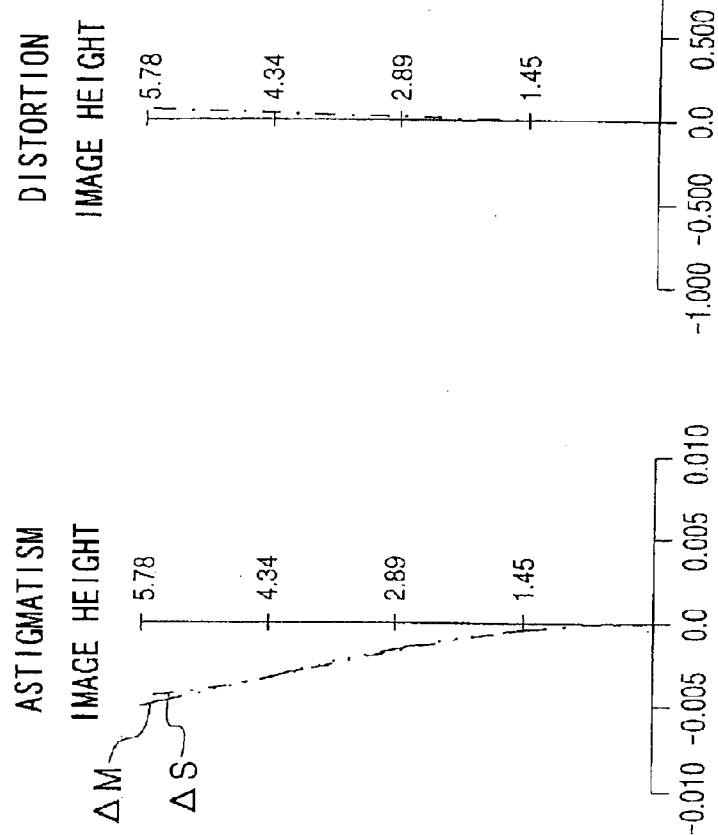
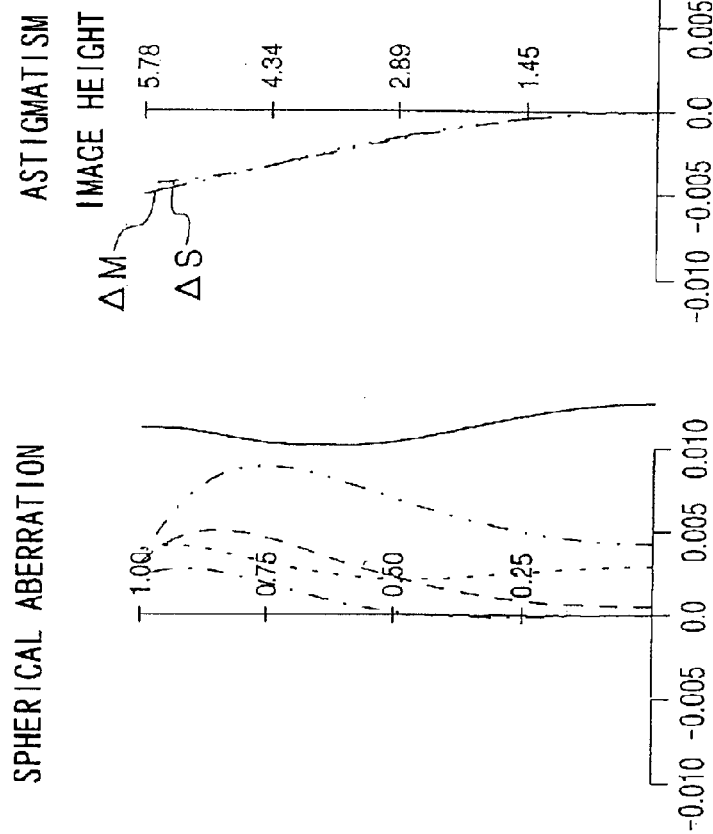
Fig.16A / Fig.16B / Fig.16C

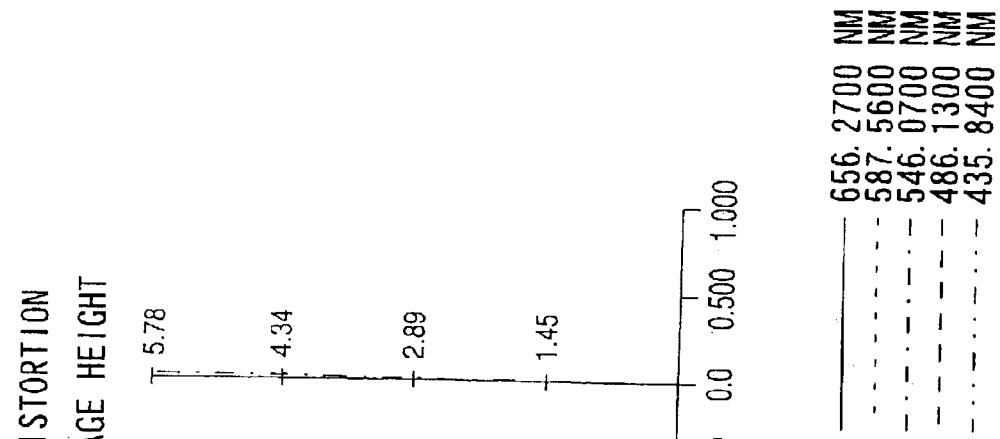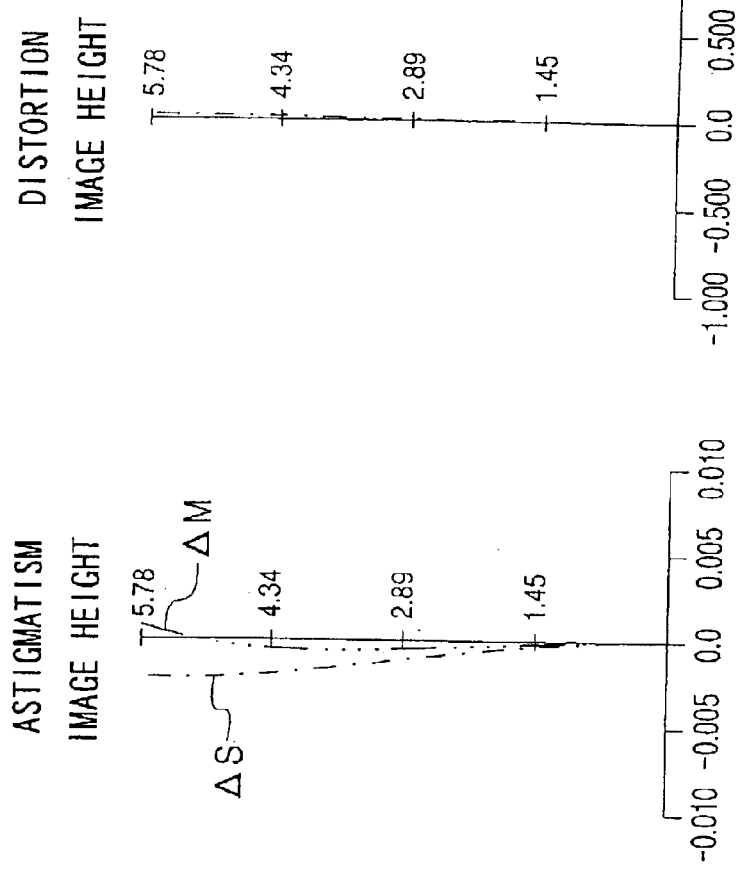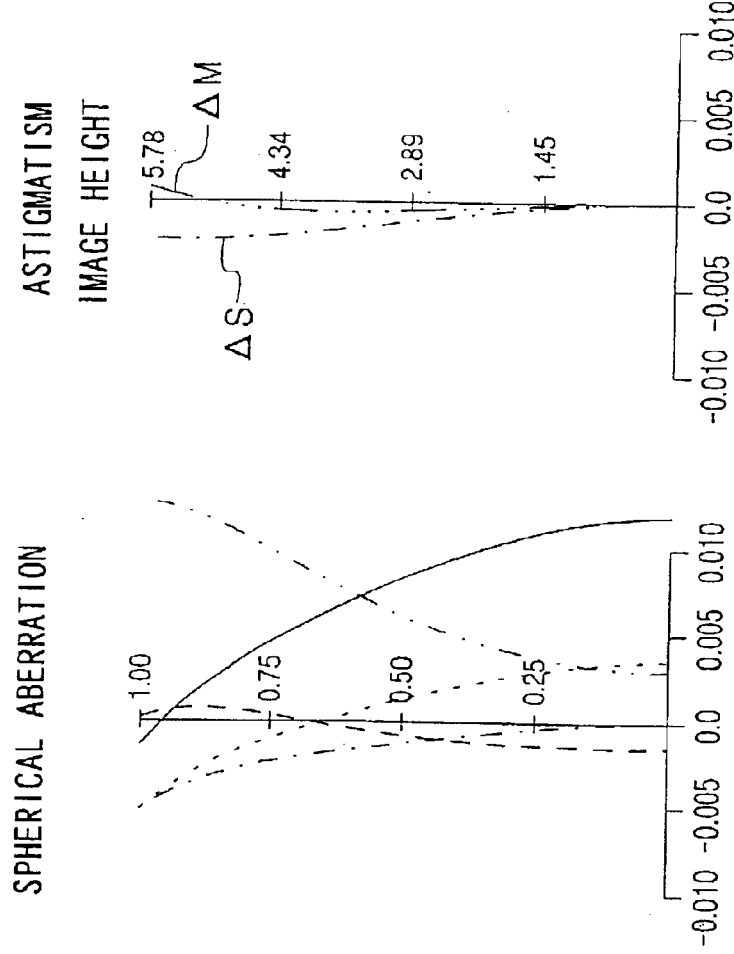

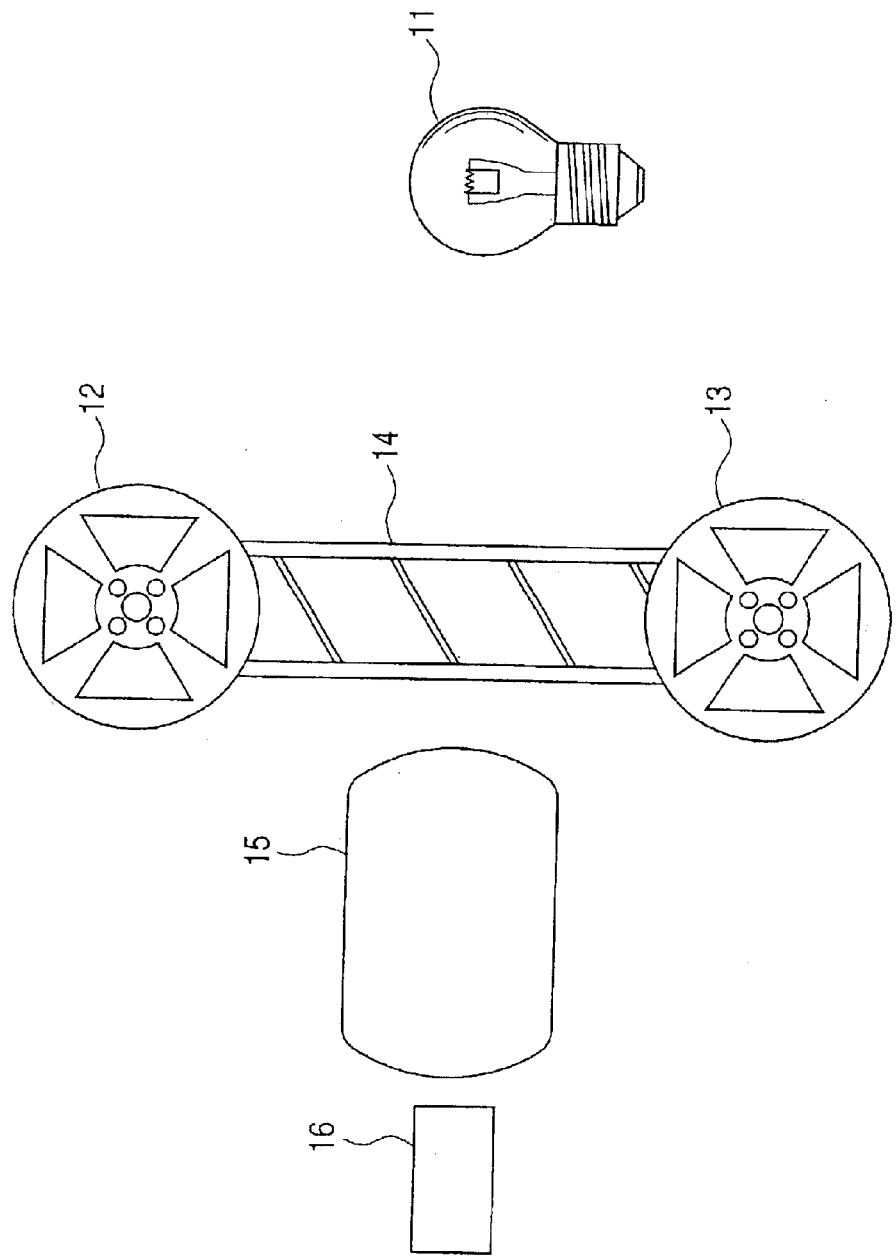

IMAGE FORMING OPTICAL SYSTEM AND OPTICAL DEVICE USING THE SAME

BACKGROUND OF THE INVENTION

1. Field of the Invention

The present invention relates to a variable magnification lens in which imaging magnification can be changed in accordance with a photographing purpose, and to an optical system in which an image recorded on a film can be photographed at magnification most suitable for the film and an optical device, such as an image transforming device, using this optical system.

2. Description of Related Art

Image forming optical systems which are bilateral telecentric and are capable of changing the imaging magnification are proposed, for example, by Japanese Patent Kokai No. 2001-27726 and Japanese Patent No.2731481.

The optical system proposed by Kokai No. 2001-27726 includes, in order from the object side, a first lens unit with positive refracting power, a second lens unit with positive refracting power, a third lens unit with negative refracting power, and a fourth lens unit with positive refracting power. It is constructed as an optical system which is bilateral telecentric and is capable of changing the imaging magnification.

In this optical system, however, when the imaging magnification is changed, an object-to-image distance is varied, and thus there is the need to move the entire optical system in accordance with a change of the magnification.

The optical system proposed by Patent No. 2731481 includes, in order from the object side, a first lens unit with positive refracting power, a second lens unit with negative refracting power, and a third lens unit with positive refracting power. It is constructed as an optical system which is bilateral telecentric and changes the imaging magnification while constantly keeping the object-to-image distance.

In this optical system, however, its F-number fluctuates considerably, depending on the imaging magnification, for example, so that when the imaging magnification is 0.25×, an image-side F-number is 8.741 and when the imaging magnification is 1.00×, the image-side F-number is 14.286. Therefore, the problem arises that when the imaging magnification is changed, the brightness of a camera must be adjusted accordingly.

SUMMARY OF THE INVENTION

It is, therefore, an object of the present invention to provide an image forming optical system in which even when the imaging magnification is changed, the object-to-image distance remains unchanged and there is little fluctuation in F-number.

In order to accomplish this object, the image forming optical system according to the present invention includes, in order from the object side toward the image side, a first lens unit with positive refracting power, a second lens unit with positive refracting power, a third lens unit with negative refracting power, a fourth lens unit with positive refracting power, and an aperture stop interposed between the third lens unit and the fourth lens unit. The image forming optical system has a variable magnification optical system in which spacings between the first lens unit and the second lens unit, between the second lens unit and the third lens unit, and between the third lens unit and the fourth lens unit are changed to vary the imaging magnification. In this case, the image forming optical system changes the imaging magnification while constantly keeping the object-to-image distance thereof, and in at least one variable magnification state where the imaging magnification is changed, satisfies the following conditions:

$$|En|/L > 0.4$$

$$|Ex|/|L/\beta| > 0.4$$

where En is a distance from a first lens surface on the object side of the variable magnification optical system to the entrance pupil of the image forming optical system, L is the object-to-image distance of the image forming optical system, Ex is a distance from the last lens surface on the image side of the variable magnification optical system to the exit pupil of the image forming optical system, and $\beta$ is the magnification of the whole of the image forming optical system.

The image forming optical system of the present invention also satisfies the following conditions:

$$1.0 < \text{MAXFNO} < 8.0$$

$$|\Delta \text{FNO}/\Delta \beta| < 5$$

where MAXFNO is an object-side F-number which is smallest when the imaging magnification of the image forming optical system is changed, $\Delta$FNO is a difference between the object-side F-number at the minimum magnification of the whole of the image forming optical system and that at the maximum magnification of the whole of the image forming optical system, and $\Delta\beta$ is a difference between the minimum magnification of the whole of the image forming optical system and the maximum magnification of the whole of the image forming optical system.

The image forming optical system of the present invention further satisfies the following condition:

$$0.6 < |(R3f + R3b)/(R3f - R3b)| < 5.0$$

where R3f is the radius of curvature of the most object-side surface of the third lens unit and R3b is the radius of curvature of the most image-side surface of the third lens unit.

The optical device of the present invention uses the image forming optical system of the present invention.

According to the present invention, the image forming optical system in which even when the imaging magnification is changed, the object-to-image distance remains unchanged and there is little fluctuation in F-number, and the optical device using this image forming optical system, can be obtained.

This and other objects as well as the features and advantages of the present invention will become apparent from the following detailed description when taken in conjunction with the accompanying drawings.

BRIEF DESCRIPTION OF THE DRAWINGS

FIG. 1A is a sectional view showing an optical arrangement, developed along the optical axis, where the imaging magnification is set to 0.3× in a first embodiment of the image forming optical system according to the present invention;

FIG. 1B is a sectional view showing an optical arrangement, developed along the optical axis, where the imaging magnification is set to 0.4× in the first embodiment;

FIG. 1C is a sectional view showing an optical arrangement, developed along the optical axis, where the imaging magnification is set to 0.5× in the first embodiment;

FIGS. 2A, 2B, and 2C are diagrams showing aberration characteristics in focusing of an infinite object point where the imaging magnification is set to 0.4× in the first embodiment;

FIGS. 4A, 4B, and 4C are diagrams showing aberration characteristics in focusing of an infinite object point where the imaging magnification is set to 0.4× in the second embodiment;

FIGS. 6A, 6B, and 6C are diagrams showing aberration characteristics in focusing of an infinite object point where the imaging magnification is set to 0.4× in the third embodiment;

FIG. 7A is a sectional view showing an optical arrangement, developed along the optical axis, where the imaging magnification is set to 0.3× in a fourth embodiment of the image forming optical system according to the present invention;

FIG. 7B is a sectional view showing an optical arrangement, developed along the optical axis, where the imaging magnification is set to 0.4× in the fourth embodiment;

FIG. 7C is a sectional view showing an optical arrangement, developed along the optical axis, where the imaging magnification is set to 0.5× in the fourth embodiment;

FIGS. 8A, 8B, and 8C are diagrams showing aberration characteristics in focusing of an infinite object point where the imaging magnification is set to 0.4× in the fourth embodiment;

FIG. 9A is a sectional view showing an optical arrangement, developed along the optical axis, where the imaging magnification is set to 0.3× in a fifth embodiment of the image forming optical system according to the present invention;

FIG. 9B is a sectional view showing an optical arrangement, developed along the optical axis, where the imaging magnification is set to 0.4× in the fifth embodiment;

FIG. 9C is a sectional view showing an optical arrangement, developed along the optical axis, where the imaging magnification is set to 0.5× in the fifth embodiment;

FIGS. 10A, 10B, and 10C are diagrams showing aberration characteristics in focusing of an infinite object point where the imaging magnification is set to 0.4× in the fifth embodiment;

FIGS. 12A, 12B, and 12C are diagrams showing aberration characteristics in focusing of an infinite object point where the imaging magnification is set to 0.4× in the sixth embodiment;

FIGS. 14A, 14B, and 14C are diagrams showing aberration characteristics in focusing of an infinite object point where the imaging magnification is set to 0.4× in the seventh embodiment;

FIG. 15A is a sectional view showing an optical arrangement, developed along the optical axis, where the imaging magnification is set to 0.3× in an eighth embodiment of the image forming optical system according to the present invention;

FIG. 15B is a sectional view showing an optical arrangement, developed along the optical axis, where the imaging magnification is set to 0.4× in the eighth embodiment;

FIG. 15C is a sectional view showing an optical arrangement, developed along the optical axis, where the imaging magnification is set to 0.5× in the eighth embodiment;

FIGS. 16A, 16B, and 16C are diagrams showing aberration characteristics in focusing of an infinite object point where the imaging magnification is set to 0.4× in the eighth embodiment;

FIGS. 18A, 18B, and 18C are diagrams showing aberration characteristics in focusing of an infinite object point where the imaging magnification is set to 0.4× in the ninth embodiment;

FIG. 19 is a conceptual view showing an example of a telecine device using the image forming optical system of the present invention.

DETAILED DESCRIPTION OF THE PREFERRED EMBODIMENTS

Figure 3A:
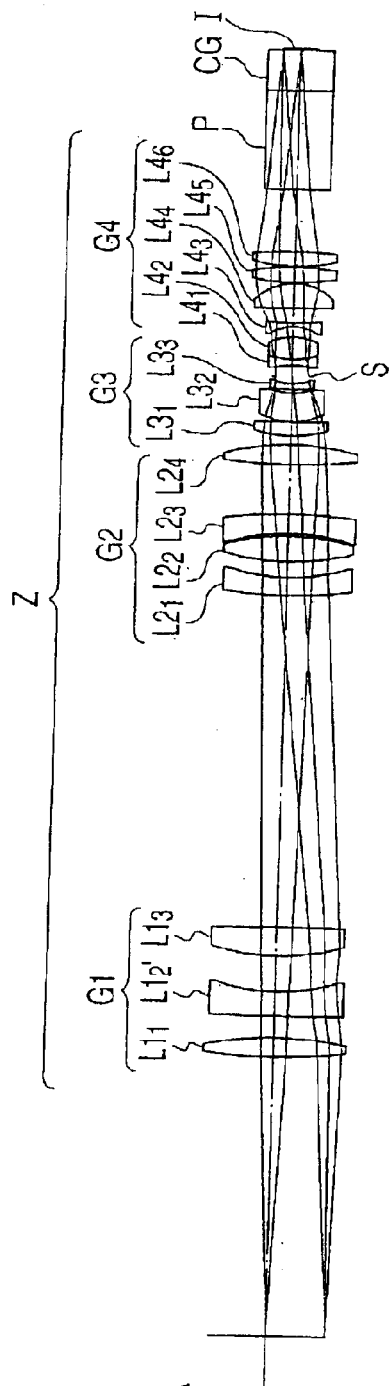
FIG. 3A is a sectional view showing an optical arrangement, developed along the optical axis, where the imaging magnification is set to 0.3× in a second embodiment of the image forming optical system according to the present invention.

Before the description of the embodiments, reference is made to the function and effect of the present invention.

In the image forming optical system of the present invention, as mentioned above, the variable magnification optical system includes four lens units with positive, positive, negative, and positive powers. Object-side lens units situated ahead of (on the object side of) the stop are the first lens unit with positive refracting power, the second lens unit with positive refracting power, and the third lens unit with negative refracting power, and the whole of these lens units is constructed as a lens system with positive refracting power. The fourth lens unit situated behind (on the image side of) the stop is constructed as a lens system with positive refracting power. The aperture stop is interposed between the third lens unit and the fourth lens unit.

The image forming optical system of the present invention is designed to change the imaging magnification while constantly keeping the object-to-image distance. That is, the image forming optical system of the present invention is such that a conjugate length is fixed.

The image forming optical system of the present invention satisfies the following conditions in at least one variable magnification state where the imaging magnification is changed and is constructed to be bilateral telecentric:

$$|En|/L > 0.4 \quad (1)$$

$$|Ex|/|L/\beta| > 0.4 \quad (2)$$

where En is a distance from a first lens surface on the object side of the variable magnification optical system to the entrance pupil of the image forming optical system, L is the object-to-image distance of the image forming optical system, Ex is a distance from the last lens surface on the image side of the variable magnification optical system to the exit pupil of the image forming optical system, and β is the magnification of the whole of the image forming optical system.

The image forming optical system of the present invention is constructed so that the stop is placed at the focal position of the lens system composed of the first to third lens units situated on the object side of the stop. By this construction, the entrance pupil which is the image of the stop is projected at infinity. As a result, the image forming optical system of the present invention is constructed as an object-side telecentric optical system.

The image forming optical system of the present invention is constructed so that the stop is placed at the focal position of the lens system composed of the fourth lens unit situated on the image side of the stop. By this construction, the exit pupil which is the image of the stop is projected at infinity. As a result, the image forming optical system of the present invention is also constructed as an image-side telecentric optical system.

In the image forming optical system of the present invention constructed as mentioned above, the roles of multivariators are assigned to both the second lens unit with positive refracting power and the third lens unit with negative refracting power. By doing so, a combined focal length of the first to third lens units situated on the object side of the stop can be changed.

The image forming optical system of the present invention is constructed so that the stop is interposed between the third lens unit with negative refracting power and the fourth lens unit with positive refracting power. A variable magnification function is not imparted to the fourth lens unit located on the image side of the stop. The stop is designed so that even when the imaging magnification is changed, the shift of the position of the stop is suppressed as far as possible and is practically fixed. Thus, the stop is always located in the proximity of the focal position of the fourth lens unit, and thereby the imaging magnification can be changed while maintaining an exit-side telecentric characteristic and F-number.

However, in order to maintain an object-side telecentric characteristic and fix the conjugate length while constantly keeping the F-number when the imaging magnification is changed, it is necessary to satisfy the following conditions.

First, even when the magnification is changed, the stop must be located at the combined focal point of the first to third lens units on the object side of the stop.

Second, even when the magnification is changed, a distance from the surface of the object to that of the stop must be kept to be nearly constant.

In the construction of positive, negative, and positive powers, if the first lens unit is divided into two lens units with positive and negative refracting powers, the balance between the refracting powers will be destroyed. Consequently, chromatic aberration of magnification and distortion are increased.

However, when the first lens unit is divided into two lens units with positive and positive refracting powers, as in the present invention, so that four lens units with positive, positive, negative, and positive refracting powers are constructed, the amount of production of aberration can be minimized.

In a bilateral telecentric optical system, even when the magnification is changed, an off-axis ray at the position of stop is nearly parallel with the optical axis. The lens unit located on the image side of the stop is the fourth lens unit alone, and since the fourth lens unit is not moved, the focal length becomes constant. Therefore, when the magnification is changed, there is little fluctuation in F-number, and thus even when the magnification is changed, the brightness of the camera need not be adjusted.

The construction of the object-side telecentric optical system like the image forming optical system of the present invention offers advantages described below.

For example, the advantages are described with respect to a telecine device (a motion picture film scanner). The telecine device is such that a motion picture film is digitized. The telecine device is constructed so that the film is illuminated by an illumination optical system and an image is formed by a solid-state image sensor, such as a CCD, through an image forming optical system.

If the image forming optical system of the telecine device, like the image forming optical system of the present invention, is constructed as the object-side telecentric optical system, pupil matching between an illumination system and an image forming system will be facilitated and the loss of the amount of light can be reduced. Furthermore, a change of magnification on the image plane caused by the disturbance of film flatness can be minimized.

The construction of the image-side telecentric optical system like the image forming optical system of the present invention offers advantages described below.

For example, the advantages are described with respect to a so-called multi-sensor camera which uses image sensors in accordance with colors such as R, B, and G. In this multi-sensor camera, a color dispersion prism is generally used. This prism is provided with a dispersion interference film splitting light according to wavelength, namely a dichroic film, deposited on its interface. If the exit pupil is located close to the image plane, the angle of incidence at which a chief ray is incident on the interference film will be changed in accordance with the position of an image point of the image plane. As a result, the optical path length of film thickness is changed and a color dispersion characteristic varies with the field angle. Thus, color reproducibility is varied, that is, color shading is produced.

However, when the image forming optical system of the multi-sensor camera, like the image forming optical system of the present invention, is constructed as the image-side telecentric optical system, the color shading can be suppressed.

Here, for example, it is assumed that a solid-state image sensor, such as a CCD, is placed on the image side of the color dispersion prism. If the exit pupil is located close to the image plane, the chief ray will be obliquely incident on a pixel. Hence, off-axis incident light is mainly blocked by a structure such as the CCD, and the amount of light is impaired or light other than that to enter an original light-receiving section is incident thereon. Consequently, signals other than original information are output. That is, shading occurs.

However, when the image forming optical system of the multi-sensor camera, like the image forming optical system of the present invention, is constructed as the image-side telecentric optical system, the shading can be suppressed.

The image forming optical system of the present invention is also constructed as a bilateral telecentric optical system. The imaging magnification can thus be practically determined by the ratio between the focal length of the lens units on the object side of the stop and that of the lens unit on the image side of the stop.

Spacings between individual lens units located on the object side of the stop are changed to vary the focal length thereof. By doing so, the imaging magnification can be altered.

In the image forming optical system of the present invention, the first lens unit has positive refracting power so that the entrance pupil which is the image of the stop is projected at infinity. In doing so, the chief ray on the object side of the first lens unit is refracted parallel to the optical axis, and thereby the object-side telecentric optical system can be realized.

In the image forming optical system of the present invention, the second lens unit has positive refracting power and the third lens unit has negative refracting power. The spacing between the second lens unit and the third lens unit is changed to vary a combined focal length of the second and third lens units. That is, the second and third lens units are designed to function as multi-variators. Thus, the second and third lens units are moved and thereby the magnification can be optimally adjusted to the size of the object.

When the third lens unit, as in the image forming optical system of the present invention, is constructed to have negative refracting power, the Petzval sum is increased, and an optical system that is free of curvature of field can be obtained.

In the image forming optical system of the present invention, the positive refracting power is imparted to the fourth lens unit so that the exit pupil which is the image of the stop is projected at infinity. In doing so, the chief ray on the image side of the fourth lens unit is made parallel to the optical axis, and thereby the image-side telecentric optical system can be realized.

When the image forming optical system of the present invention provided with a variable magnification function described above is used to constitute the optical device, there are advantages described below.

For example, the advantages are explained with respect to the telecine device as mentioned above. The telecine device is such that a video camera is attached to a film imaging device. It is constructed so that a film image is converted into a video signal and is digitized.

On the other hand, the motion picture film has a plurality of standards and the size of a film image section varies with each standard. For example, the size of a standard 35 mm film is 16×21.9 mm and a European wide film measures 11.9×21.95 mm. In this way, aspect ratios vary with film standards. The size of the imaging plane of the CCD, for example, in a 2/3 type CCD solid-state image sensor, is 5.4×9.6 mm. In order to photograph an image with high-precision and -density pixels, it is desirable to acquire image information over the entire CCD imaging area. For this, it becomes necessary to change the imaging magnification to the film standard.

However, when the image forming optical system of the present invention is used to constitute the optical device, films of various standards can be digitized, for example, in the telecine device. In this case, even when the imaging magnification is changed, the conjugate length remains unchanged and the image-side F-number can be maintained with little fluctuation.

For example, when the image forming optical system of the present invention is used in the multi-sensor camera, color shading by the color dispersion prism and the shading of the CCD camera can be suppressed. Moreover, the imaging magnification can be changed, without moving the camera, in accordance with the film standard and the size of the object, and even when the magnification is changed, there is no need to adjust brightness.

In the image forming optical system of the present invention, to obtain further bilateral telecentricity, it is desirable that when the imaging magnification is changed, the optical system, instead of satisfying Conditions (1) and (2) in at least one variable magnification state, satisfies the following conditions:

$$|En|/L > 0.8 \tag{1'}$$

$$|Ex|/|L/\beta| < 0.8 \tag{2'}$$

It is more desirable to satisfy the following conditions:

$$|En|/L < 1.6 \tag{1''}$$

$$|Ex|/|L/\beta| < 1.6 \tag{2''}$$

In the image forming optical system of the present invention, the F-number is defined by the following conditions:

$$1.0 < MAXFNO < 8.0 \tag{3}$$

$$|\Delta FNO/\Delta\beta| < 5 \tag{4}$$

where MAXFNO is an object-side F-number which is smallest when the imaging magnification of the image forming optical system is changed, ΔFNO is a difference between the object-side F-number at the minimum magnification of the whole of the image forming optical system and that at the maximum magnification of the whole of the image forming optical system, and Δβ is a difference between the minimum magnification of the whole of the image forming optical system and the maximum magnification of the whole of the image forming optical system.

If the F-number is extremely small, the number of lenses must be increased to correct aberration. As a result, the problem arises that the entire length of the optical system is increased. On the other hand, if the F-number is extremely large, the amount of light becomes insufficient, which is not suitable for motion picture photography.

However, when the optical system satisfies Condition (3), the F-number is neither extremely small nor large. Hence, the above problem, such as an increase of the entire length of the optical system or unsuitability for motion picture photography, can be solved. Also, the F-number stands for the brightness of an optical system, and as its numerical value is decreased, the optical system becomes bright.

If the value of $|\Delta FNO/\Delta\beta|$ is extremely large, the fluctuation of the image-side F-number where the magnification is changed becomes prominent. As a result, the brightness of the camera must be adjusted.

However, when the optical system satisfies Condition (4), there is no need to adjust the brightness of the camera.

Preferably, it is desirable to satisfy the following conditions:

$$2.0 < MAXFNO < 5.6 \quad (3')$$

$$|\Delta FNO/\Delta\beta| < 3 \quad (4')$$

It is more desirable to satisfy the following conditions:

$$3.0 < MAXFNO < 4.0 \quad (3'')$$

$$|\Delta FNO/\Delta\beta| < 1 \quad (4'')$$

In the image forming optical system of the present invention, it is desirable that the most object-side lens of the first lens unit has positive refracting power.

When the most object-side lens of the first lens unit is constructed as a positive lens, the height of an off-axis beam can be lowered, and thus aberration is minimized.

In the image forming optical system of the present invention, it is desirable that the first lens unit is constructed with, in order from the object side, positive, negative, and positive lenses.

When the first lens unit is constructed in this way, chromatic aberration of magnification and off-axis chromatic aberration can be corrected.

In the image forming optical system of the present invention, it is desirable to satisfy the following condition:

$$0.6 < |(R3f+R3b)/(R3f-R3b)| < 5.0 \quad (5)$$

where $|(R3f+R3b)/(R3f-R3b)|$ is a virtual shape factor, R3f is the radius of curvature of the most object-side surface of the third lens unit, and R3b is the radius of curvature of the most image-side surface of the third lens unit.

When the optical system satisfies this condition, the fluctuation of off-axis aberration can be kept to a minimum even when the third lens unit is moved along the optical axis to change the magnification.

If the value of the virtual shape factor exceeds the upper limit, the curvature of the most object-side surface of the third lens unit will approach that of the most image-side surface of the third lens unit. Thus, the refracting power of the third lens unit is extremely weakened. Consequently, when the magnification is changed, a considerable amount of movement of the third lens unit is required. If the amount of movement of the third lens unit is large, a ray height at which the off-axis beam is incident on the third lens unit will fluctuate. As a result, the fluctuation of off-axis aberration becomes prominent.

On the other hand, if the value of the virtual shape factor is below the lower limit, the refracting power of the third lens unit will be extremely strengthened. Consequently, the angle of incidence of the off-axis beam on the third lens unit is increased, and the fluctuation of off-axis aberration caused by the movement of the third lens unit becomes pronounced.

However, when the optical system satisfies Condition (5), it is avoidable that the refracting power of the third lens unit is extremely strengthened or weakened, and the problem that the fluctuation of off-axis aberration becomes pronounced, as mentioned above, can be solved.

Preferably, it is desirable to satisfy the following condition:

$$1.2 < |(R3f+R3b)/(R3f-R3b)| < 3.5 \quad (5')$$

It is more desirable to satisfy the following condition:

$$2.0 < |(R3f+R3b)/(R3f-R3b)| < 3.0 \quad (5'')$$

In the image forming optical system of the present invention, it is desirable that the third lens unit has at least two meniscus lenses, each with a convex surface directed toward the object side. It is more desirable to have at least three meniscus lenses.

More specifically, for example, it is favorable that the third lens unit has two negative meniscus lenses, each with a convex surface directed toward the object side, and a positive meniscus lens with a convex surface directed toward the object side.

Since the third lens unit is located close to the stop, off-axis rays are incident on the third lens unit at almost the same angle, irrespective of the field angles.

A meniscus lens whose convex surface is directed toward the object side, that is, whose object-side surface has positive refracting power, practically has the minimum deflection angle with respect to axial and off-axis beams of individual field angles, and hence the production of aberration can be prevented.

In accordance with the drawings, the embodiments of the present invention will be described below.

First Embodiment

FIGS. 1A, 1B, and 1C show optical arrangements where imaging magnifications are set to 0.3×, 0.4×, and 0.5×, respectively, in the first embodiment. FIGS. 2A, 2B, and 2C show aberration characteristics in focusing of an infinite object point where the imaging magnification is set to 0.4× in the first embodiment.

The image forming optical system of the first embodiment includes a variable magnification optical system Z. In this figure, reference symbol P represents a prism, CG represents a glass cover, and I represents an imaging plane.

The variable magnification optical system Z comprises, in order form the object side toward the image side, a first lens unit G1 with positive refracting power, a second lens unit G2 with positive refracting power, a third lens unit G3 with negative refracting power, an aperture stop S, and a fourth lens unit G4 with positive refracting power.

The first lens unit G1 includes a biconvex lens $L1_1$, a biconcave lens $L1_2$, and a biconvex lens $L1_3$, arranged in this order from the object side.

The second lens unit G2 includes a negative meniscus lens $L2_1$ with a convex surface directed toward the object side, a biconvex lens $L2_2$, a negative meniscus lens $L2_3$ with a concave surface directed toward the object side, and a biconvex lens $L2_4$, arranged in this to order from the object side.

The third lens unit G3 includes a positive meniscus lens $L3_1$ with a convex surface directed toward the object side, a negative meniscus lens $L3_2$ with a convex surface directed toward the object side, and a negative meniscus lens $L3_3$ with a convex surface directed toward the object side.

The fourth lens unit G4 includes a cemented lens with a biconcave lens $L4_1$ and a biconvex lens $L4_2$, a biconcave lens $L4_3$, a biconvex lens $L4_4$, a biconvex lens $L4_5$, and a biconvex lens $L4_6$.

When the magnification is changed from 0.3× to 0.5× in focusing of the infinite object point, the first lens unit G1, after being moved once toward the object side, is moved toward the image side; the second lens unit G2 is moved toward the object side; the third lens unit G3 is moved, together with the stop S, toward the image side; and the fourth lens unit G4 is moved toward the image side so that spacing between the third lens unit G3 and the fourth lens unit G4 is slightly widened.

The object-to-image distance where the magnification is changed is constantly maintained.

Subsequently, numerical data of optical members constituting the image forming optical system of the first embodiment are listed below. In the numerical data, $r_0$, $r_1$, $r_2$, ... denote radii of curvature of surfaces of individual optical members, shown in this order from the object side; $d_0$, $d_1$, $d_2$, ... denote thicknesses of individual optical members or spacings between them (unit: mm), shown in this order from the object side; $n_{e1}$, $n_{e2}$, ... denote refractive indices of individual optical members at the e line, shown in this order from the object side; and $v_{e1}$, $v_{e2}$, ... denote Abbe's numbers of individual optical members at the e line, shown in this order from the object side. These symbols are also applied to the numerical data of other embodiments.

Numerical data 1

Image height: 5.783

$r_0 = \infty$ (object)
$\quad d_0 = 50.000$
$r_1 = \infty$ (object surface)
$\quad d_1 = D1$
$r_2 = 189.5313$
$\quad d_2 = 7.308 \quad n_{e2} = 1.48915 \quad v_{e2} = 70.04$
$r_3 = -117.0877$
$\quad d_3 = 10.588$
$r_4 = -6124.8097$
$\quad d_4 = 6.910 \quad n_{e4} = 1.61639 \quad v_{e4} = 44.15$
$r_5 = 67.5133$
$\quad d_5 = 12.028$
$r_6 = 88.2299$
$\quad d_6 = 8.685 \quad n_{e6} = 1.43985 \quad v_{e6} = 94.53$
$r_7 = -425.3119$
$\quad d_7 = D7$
$r_8 = 148.1127$
$\quad d_8 = 6.000 \quad n_{e8} = 1.61639 \quad v_{e8} = 44.15$
$r_9 = 64.7754$
$\quad d_9 = 5.355$ -continued

Numerical data 1

$r_{10} = 88.2208$
$\quad d_{10} = 8.016 \quad n_{e10} = 1.43985 \quad v_{e10} = 94.53$
$r_{11} = -81.9368$
$\quad d_{11} = 1.062$
$r_{12} = -69.6148$
$\quad d_{12} = 7.000 \quad n_{e12} = 1.61639 \quad v_{e12} = 44.15$
$r_{13} = -171.6506$
$\quad d_{13} = 17.627$
$r_{14} = 210.1703$
$\quad d_{14} = 6.814 \quad n_{e14} = 1.43985 \quad v_{e14} = 94.53$
$r_{15} = -82.3361$
$\quad d_{15} = D15$
$r_{16} = 40.6305$
$\quad d_{16} = 4.323 \quad n_{e16} = 1.69417 \quad v_{e16} = 30.83$
$r_{17} = 250.0598$
$\quad d_{17} = 0.300$
$r_{18} = 25.0517$
$\quad d_{18} = 9.360 \quad n_{e18} = 1.72538 \quad v_{e18} = 34.47$
$r_{19} = 21.5375$
$\quad d_{19} = 1.156$
$r_{20} = 41.2143$
$\quad d_{20} = 2.000 \quad n_{e20} = 1.72538 \quad v_{e20} = 34.47$
$r_{21} = 15.8016$
$\quad d_{21} = 2.560$
$r_{22} = \infty$ (aperture stop)
$\quad d_{22} = D22$
$r_{23} = -29.2488$
$\quad d_{23} = 2.000 \quad n_{e23} = 1.61669 \quad v_{e23} = 44.02$
$r_{24} = 23.4936$
$\quad d_{24} = 7.647 \quad n_{e24} = 1.48915 \quad v_{e24} = 70.04$
$r_{25} = -17.8845$
$\quad d_{25} = 3.043$
$r_{26} = -13.7038$
$\quad d_{26} = 1.417 \quad n_{e26} = 1.61639 \quad v_{e26} = 44.15$
$r_{27} = 89.8893$
$\quad d_{27} = 4.829$
$r_{28} = 707.1568$
$\quad d_{28} = 8.564 \quad n_{e28} = 1.43985 \quad v_{e28} = 94.53$
$r_{29} = -18.1649$
$\quad d_{29} = 0.325$
$r_{30} = 69.4722$
$\quad d_{30} = 5.111 \quad n_{e30} = 1.43985 \quad v_{e30} = 94.53$
$r_{31} = -90.8646$
$\quad d_{31} = 0.300$
$r_{32} = 62.9985$
$\quad d_{32} = 4.778 \quad n_{e32} = 1.43985 \quad v_{e32} = 94.53$
$r_{33} = -179.4454$
$\quad d_{33} = D33$
$r_{34} = \infty$
$\quad d_{34} = 33.000 \quad n_{e34} = 1.61173 \quad v_{e34} = 46.30$
$r_{35} = \infty$
$\quad d_{35} = 13.200 \quad n_{e35} = 1.51825 \quad v_{e35} = 63.93$
$r_{36} = \infty$
$\quad d_{36} = 0.500$
$r_{37} = \infty$ (imaging plane)
$\quad d_{37} = 0.000$

Zoom data

| | 0.3× | 0.4× | 0.5× |
|---|---|---|---|
| D1 | 39.880 | 37.812 | 44.358 |
| D7 | 109.204 | 77.238 | 48.939 |
| D15 | 3.000 | 37.903 | 60.723 |
| D22 | 3.552 | 4.754 | 6.263 |
| D33 | 21.051 | 18.980 | 16.405 |

Condition parameters and others

| | 0.3× | 0.4× | 0.5× |
|---|---|---|---|
| Magnification: β | 0.3× | 0.4× | 0.5× |
| Entrance pupil position: En | 1160.856 | 20252.775 | −1133.552 |
| Object-to-image distance: L | 428.492 | 428.492 | 428.492 |
| \|EN\|/L | 2.709 | 47.265 | 2.645 |
| Exit pupil position: Ex | −352.468 | −578.834 | −1818.976 |
| \|Ex\|/\|L/β\| | 0.247 | 0.540 | 2.123 |
| F-number: FNO | 3.500 | 3.536 | 3.598 |

-continued

Numerical data 1

| | |
|---|---|
| The amount of fluctuation of FNO | 0.098 |
| ΔFNO/Δβ | 0.490 |
| Radius of curvature on the object side: R3f | 40.630 |
| Radius of curvature on the image side: R3b | 15.802 |
| \|(R3f + R3b)/(R3f − R3b)\| | 2.273 |

Second Embodiment

Figure 3B:
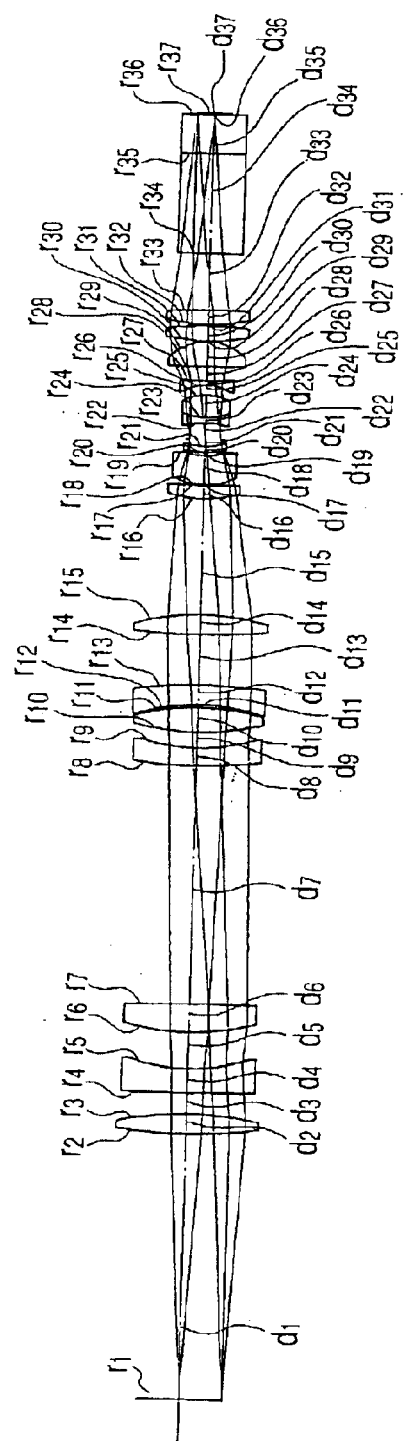
FIG. 3B is a sectional view showing an optical arrangement, developed along the optical axis, where the imaging magnification is set to 0.4× in the second embodiment.
Figure 3C:
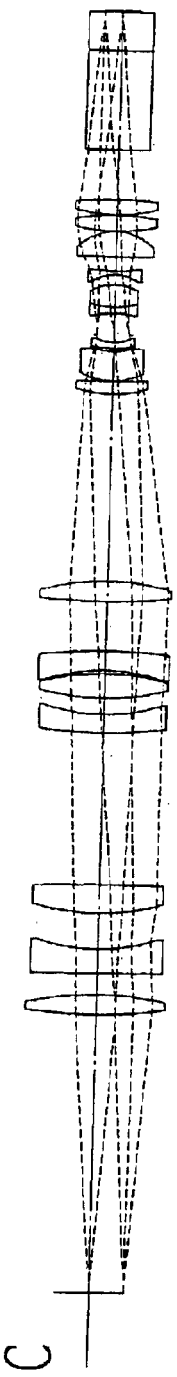
FIG. 3C is a sectional view showing an optical arrangement, developed along the optical axis, where the imaging magnification is set to 0.5× in the second embodiment.

FIGS. 3A, 3B, and 3C show optical arrangements where imaging magnifications are set to 0.3×, 0.4×, and 0.5×, respectively, in the second embodiment. FIGS. 4A, 4B, and 4C show aberration characteristics in focusing of an infinite object point where the imaging magnification is set to 0.4× in the second embodiment.

The image forming optical system of the second embodiment includes the variable magnification optical system Z. In this figure, again, reference symbol P represents a prism, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the biconvex lens $L1_1$, a negative meniscus lens $L1_2'$ with a convex surface directed toward the object side, and the biconvex lens $L1_3$, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, and the biconvex lens $L2_4$, arranged in this order from the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side, arranged in this order from the object side.

The fourth lens unit G4 includes the cemented lens with the biconcave lens $L4_1$ and the biconvex lens $L4_2$, the biconcave lens $L4_3$, the biconvex lens $L4_4$, the biconvex lens $L4_5$, and the biconvex lens $L4_6$, arranged in this order from the object side.

When the magnification is changed from 0.3× to 0.5× in focusing of the infinite object point, the first lens unit G1, after being moved once toward the object side, is moved toward the image side; the second lens unit G2 is moved toward the object side; the third lens unit G3 remains fixed together with the stop S; and the fourth lens unit G4 is moved toward the image side so that the spacing between the third lens unit G3 and the fourth lens unit G4 is slightly widened.

The object-to-image distance where the magnification is changed is constantly maintained.

Subsequently, numerical data of optical members constituting the image forming optical system of the second embodiment are listed below.

Numerical data 2

Image height: 5.783

| | | | |
|---|---|---|---|
| $r_0 = \infty$ (object) | | | |
| | $d_0 = 50.000$ | | |
| $r_1 = \infty$ (object surface) | | | |
| | $d_1 = D1$ | | |
| $r_2 = 172.4277$ | | | |
| | $d_2 = 6.648$ | $n_{e2} = 1.48915$ | $v_{e2} = 70.04$ |
| $r_3 = -112.2625$ | | | |
| | $d_3 = 7.313$ | | |
| $r_4 = 1492.6672$ | | | |
| | $d_4 = 7.985$ | $n_{e4} = 1.61639$ | $v_{e4} = 44.15$ |
| $r_5 = 62.4069$ | | | |
| | $d_5 = 12.125$ | | |
| $r_6 = 79.8565$ | | | |
| | $d_6 = 9.415$ | $n_{e6} = 1.43985$ | $v_{e6} = 94.53$ |
| $r_7 = -1585.7009$ | | | |
| | $d_7 = D7$ | | |
| $r_8 = 151.8708$ | | | |
| | $d_8 = 6.000$ | $n_{e8} = 1.61639$ | $v_{e8} = 44.15$ |
| $r_9 = 64.4718$ | | | |
| | $d_9 = 5.384$ | | |
| $r_{10} = 86.7203$ | | | |
| | $d_{10} = 8.163$ | $n_{e10} = 1.43985$ | $v_{e10} = 94.53$ |
| $r_{11} = -80.8037$ | | | |
| | $d_{11} = 1.049$ | | |
| $r_{12} = -68.7719$ | | | |
| | $d_{12} = 6.410$ | $n_{e12} = 1.61639$ | $v_{e12} = 44.15$ |
| $r_{13} = -178.7270$ | | | |
| | $d_{13} = 16.603$ | | |
| $r_{14} = 219.0646$ | | | |
| | $d_{14} = 6.722$ | $n_{e14} = 1.43985$ | $v_{e14} = 94.53$ |
| $r_{15} = -81.1984$ | | | |
| | $d_{15} = D15$ | | |
| $r_{16} = 40.1465$ | | | |
| | $d_{16} = 4.375$ | $n_{e16} = 1.69417$ | $v_{e16} = 30.83$ |
| $r_{17} = 229.4681$ | | | |
| | $d_{17} = 0.300$ | | |
| $r_{18} = 24.8118$ | | | |
| | $d_{18} = 9.366$ | $n_{e18} = 1.72538$ | $v_{e18} = 34.47$ |
| $r_{19} = 21.1952$ | | | |
| | $d_{19} = 1.169$ | | |
| $r_{20} = 40.9998$ | | | |
| | $d_{20} = 2.000$ | $n_{e20} = 1.72538$ | $v_{e20} = 34.47$ |
| $r_{21} = 15.9793$ | | | |
| | $d_{21} = 2.555$ | | |
| $r_{22} = \infty$ (aperture stop) | | | |
| | $d_{22} = D22$ | | |
| $r_{23} = -29.1565$ | | | |
| | $d_{23} = 2.000$ | $n_{e23} = 1.61669$ | $v_{e23} = 44.02$ |
| $r_{24} = 23.6864$ | | | |
| | $d_{24} = 7.373$ | $n_{e24} = 1.48915$ | $v_{e24} = 70.04$ |
| $r_{25} = -18.0561$ | | | |
| | $d_{25} = 3.435$ | | |
| $r_{26} = -13.7966$ | | | |
| | $d_{26} = 1.355$ | $n_{e26} = 1.61639$ | $v_{e26} = 44.15$ |
| $r_{27} = 84.7189$ | | | |
| | $d_{27} = 4.778$ | | |
| $r_{28} = 547.3608$ | | | |
| | $d_{28} = 8.544$ | $n_{e28} = 1.43985$ | $v_{e28} = 94.53$ |
| $r_{29} = -18.0837$ | | | |
| | $d_{29} = 0.300$ | | |
| $r_{30} = 70.0296$ | | | |
| | $d_{30} = 5.063$ | $n_{e30} = 1.43985$ | $v_{e30} = 94.53$ |
| $r_{31} = -93.9274$ | | | |
| | $d_{31} = 0.388$ | | |
| $r_{32} = 58.3720$ | | | |
| | $d_{32} = 4.869$ | $n_{e32} = 1.43985$ | $v_{e32} = 94.53$ |
| $r_{33} = -203.9907$ | | | |
| | $d_{33} = D33$ | | |
| $r_{34} = \infty$ | | | |
| | $d_{34} = 33.000$ | $n_{e34} = 1.61173$ | $v_{e34} = 46.30$ |
| $r_{35} = \infty$ | | | |
| | $d_{35} = 13.200$ | $n_{e35} = 1.51825$ | $v_{e35} = 63.93$ |

-continued

Numerical data 2

$r_{36} = \infty$
$d_{36} = 0.500$
$r_{37} = \infty$ (imaging plane)
$d_{37} = 0.000$ Zoom data

|  | 0.3× | 0.4× | 0.5× |
|---|---|---|---|
| D1 | 43.904 | 39.311 | 43.788 |
| D7 | 110.381 | 79.183 | 50.950 |
| D15 | 3.089 | 38.880 | 62.637 |
| D22 | 3.559 | 5.250 | 7.195 |
| D33 | 20.639 | 18.949 | 17.003 |

Condition parameters and others

| Magnification: β | 0.3× | 0.4× | 0.5× |
|---|---|---|---|
| Entrance pupil position: En | 1124.667 | 16516.516 | −1141.823 |
| Object-to-image distance: L | 429.959 | 429.959 | 429.959 |
| \|En\|/L | 2.616 | 38.414 | 2.656 |
| Exit pupil position: Ex | −351.154 | −741.700 | 24496.963 |
| \|Ex\|/\|L/β\| | 0.245 | 0.690 | 28.488 |
| F-number: FNO | 3.500 | 3.560 | 3.646 |
| The amount of fluctuation of FNO |  |  | 0.146 |
| ΔFNO/Δβ |  |  | 0.729 |
| Radius of curvature on the object side: R3f |  |  | 38.452 |
| Radius of curvature on the image side: R3b |  |  | 17.589 |
| \|(R3f + R3b)/(R3f − R3b)\| |  |  | 2.686 |

Third Embodiment

Figure 5A:
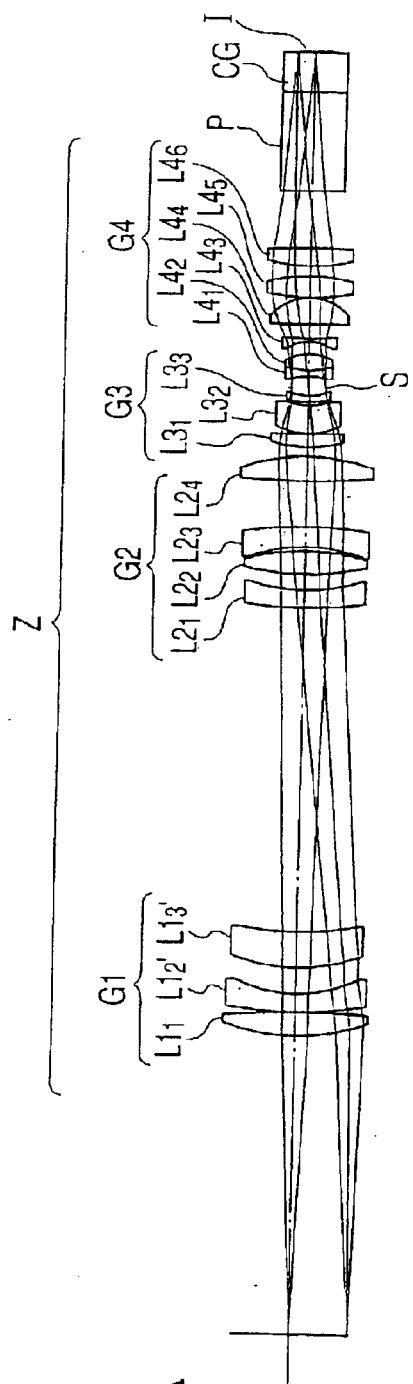
FIG. 5A is a sectional view showing an optical arrangement, developed along the optical axis, where the imaging magnification is set to 0.3× in a third embodiment of the image forming optical system according to the present invention.
Figure 5B:
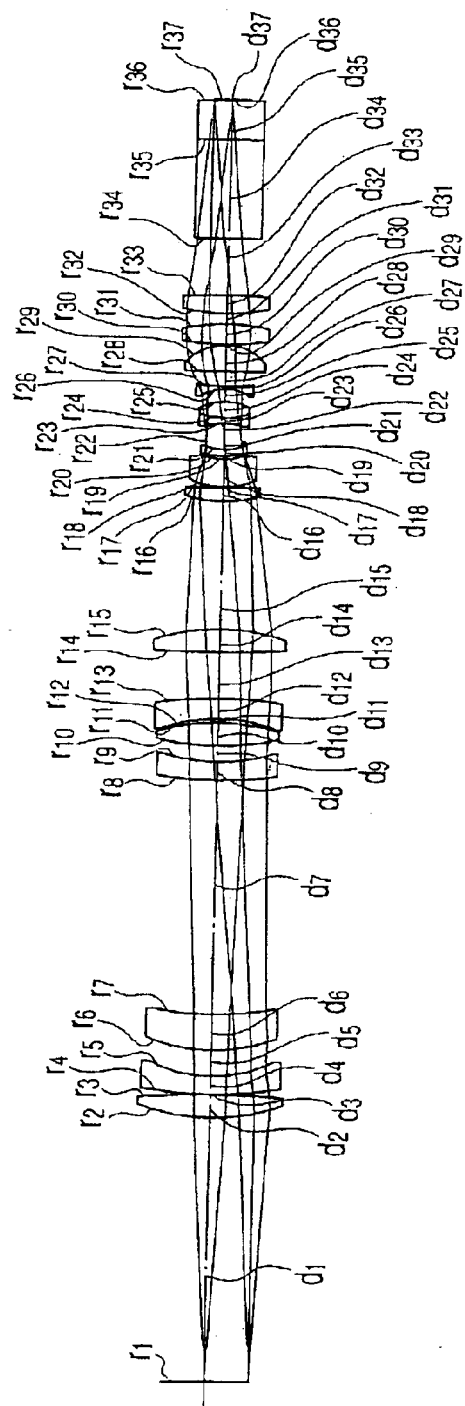
FIG. 5B is a sectional view showing an optical arrangement, developed along the optical axis, where the imaging magnification is set to 0.4× in the third embodiment.
Figure 5C:
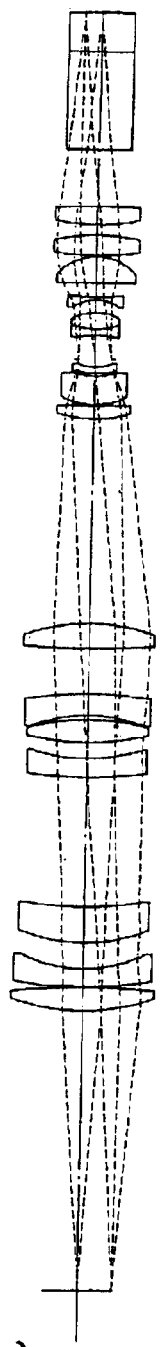
FIG. 5C is a sectional view showing an optical arrangement, developed along the optical axis, where the imaging magnification is set to 0.5× in the third embodiment.

FIGS. 5A, 5B, and 5C show optical arrangements where imaging magnifications are set to 0.3×, 0.4×, and 0.5×, respectively, in the third embodiment. FIGS. 6A, 6B, and 6C show aberration characteristics in focusing of an infinite object point where the imaging magnification is set to 0.4× in the third embodiment.

The image forming optical system of the third embodiment includes the variable magnification optical system Z. In this figure, again, reference symbol P represents a prism, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the biconvex lens $L1_1$, the negative meniscus lens $L1_2'$ with a convex surface directed toward the object side, and a positive meniscus lens $L1_3'$ with a convex surface directed toward the object side, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, and the biconvex lens $L2_4$, arranged in this order from the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side, arranged in this order from the object side.

The fourth lens unit G4 includes the cemented lens with the biconcave lens $L4_1$ and the biconvex lens $L4_2$, the biconcave lens $L4_3$, the biconvex lens $L4_4$, the biconvex lens $L4_5$, and the biconvex lens $L4_6$, arranged in this order from the object side.

When the magnification is changed from 0.3× to 0.5× in focusing of the infinite object point, the first lens unit G1, after being moved once toward the object side, is moved toward the image side; the second lens unit G2 is moved toward the object side; the third lens unit G3 is moved, together with the stop S, toward the object side so that the spacing between the third lens unit G3 and the fourth lens unit G4 is slightly widened; and the fourth lens unit G4 remains fixed.

The object-to-image distance where the magnification is changed is constantly maintained.

Subsequently, numerical data of optical members constituting the image forming optical system of the third embodiment are listed below.

Numerical data 3

Image height: 5.783

$r_0 = \infty$ (object)
$d_0 = 50.000$
$r_1 = \infty$ (object surface)
$d_1 = D1$
$r_2 = 67.5689$
$d_2 = 7.816$  $n_{e2} = 1.48915$  $v_{e2} = 70.04$
$r_3 = -335.3716$
$d_3 = 0.300$
$r_4 = 140.6380$
$d_4 = 6.025$  $n_{e4} = 1.61639$  $v_{e4} = 44.15$
$r_5 = 45.2535$
$d_5 = 8.810$
$r_6 = 57.6476$
$d_6 = 11.963$  $n_{e6} = 1.43985$  $v_{e6} = 94.53$
$r_7 = 109.0130$
$d_7 = D7$
$r_8 = 140.9050$
$d_8 = 6.209$  $n_{e8} = 1.61639$  $v_{e8} = 44.15$
$r_9 = 59.1517$
$d_9 = 5.421$
$r_{10} = 89.7738$
$d_{10} = 7.460$  $n_{e10} = 1.43985$  $v_{e10} = 94.53$
$r_{11} = -74.4487$
$d_{11} = 1.335$
$r_{12} = -57.6329$
$d_{12} = 7.000$  $n_{e12} = 1.61639$  $v_{e12} = 44.15$
$r_{13} = -145.4391$
$d_{13} = 15.344$
$r_{14} = 312.0611$
$d_{14} = 8.089$  $n_{e14} = 1.43985$  $v_{e14} = 94.53$
$r_{15} = -66.7614$
$d_{15} = D15$
$r_{16} = 42.2336$
$d_{16} = 4.331$  $n_{e16} = 1.69417$  $v_{e16} = 30.83$
$r_{17} = 254.0344$
$d_{17} = 0.300$
$r_{18} = 24.1640$
$d_{18} = 9.326$  $n_{e18} = 1.72538$  $v_{e18} = 34.47$
$r_{19} = 20.0169$
$d_{19} = 1.206$
$r_{20} = 36.3821$
$d_{20} = 2.000$  $n_{e20} = 1.72538$  $v_{e20} = 34.47$
$r_{21} = 16.7574$
$d_{21} = 2.601$
$r_{22} = \infty$ (aperture stop)
$d_{22} = D22$
$r_{23} = -26.7471$
$d_{23} = 2.030$  $n_{e23} = 1.61669$  $v_{e23} = 44.02$
$r_{24} = 24.0157$
$d_{24} = 5.463$  $n_{e24} = 1.48915$  $v_{e24} = 70.04$ -continued Numerical data 3

$r_{25} = -17.6590$
$d_{25} = 4.328$
$r_{26} = -13.4729$
$d_{26} = 1.058$  $n_{e26} = 161639$  $v_{e26} = 44.15$
$r_{27} = 93.0104$
$d_{27} = 4.726$
$r_{28} = 913.0291$
$d_{28} = 8.540$  $n_{e28} = 1.43985$  $v_{e28} = 94.53$
$r_{29} = -17.8834$
$d_{29} = 0.300$
$r_{30} = 81.9603$
$d_{30} = 6.985$  $n_{e30} = 1.43985$  $v_{e30} = 94.53$
$r_{31} = -64.2115$
$d_{31} = 3.523$
$r_{32} = 60.0466$
$d_{32} = 6.110$  $n_{e32} = 1.43985$  $v_{e32} = 94.53$
$r_{33} = -318.5459$
$d_{33} = 19.314$
$r_{34} = \infty$
$d_{34} = 33.000$  $n_{e34} = 1.61173$  $v_{e34} = 46.30$
$r_{35} = \infty$
$d_{35} = 13.200$  $n_{e35} = 151825$  $v_{e35} = 63.93$
$r_{36} = \infty$
$d_{36} = 0.500$
$r_{37} = \infty$ (imaging plane)
$d_{37} = 0.000$ Zoom data

|  | 0.3× | 0.4× | 0.5× |
|---|---|---|---|
| D1 | 50.134 | 38.319 | 43.946 |
| D7 | 107.947 | 77.883 | 43.657 |
| D15 | 3.000 | 42.757 | 69.242 |
| D22 | 3.638 | 5.759 | 7.874 |

Condition parameters and others

| Magnification: β | 0.3× | 0.4× | 0.5× |
|---|---|---|---|
| Entrance pupil position: En | 1271.479 | −18393.929 | −1095.982 |
| Object-to-image distance: L | 429.334 | 429.334 | 429.334 |
| |En|/L | 2.962 | 42.843 | 2.553 |
| Exit pupil position: Ex | −362.746 | −906.100 | 4824.866 |
| |Ex|/|L/β| | 0.253 | 0.844 | 5.619 |
| F-number: FNO | 3.500 | 3.593 | 3.687 |
| The amount of fluctuation of FNO |  |  | 0.187 |
| ΔFNO/Δβ |  |  | 0.935 |
| Radius of curvature on the object side: R3f |  |  | 42.234 |
| Radius of curvature on the image side: R3b |  |  | 16.757 |
| |(R3f + R3b)/(R3f − R3b)| |  |  | 2.316 |

Fourth Embodiment

FIGS. 7A, 7B, and 7C show optical arrangements where imaging magnifications are set to 0.3×, 0.4×, and 0.5×, respectively, in the fourth embodiment. FIGS. 8A, 8B, and 8C show aberration characteristics in focusing of an infinite object point where the imaging magnification is set to 0.4× in the fourth embodiment.

The image forming optical system of the fourth embodiment includes the variable magnification optical system Z. In this figure, again, reference symbol P represents a prism, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the biconvex lens $L1_1$ the negative meniscus lens $L1_2$' with a convex surface directed toward the object side, and the positive meniscus lens $L1_3$' with a convex surface directed toward the object side, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, and the biconvex lens $L2_4$, arranged in this order from the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side, arranged in this order from the object side.

The fourth lens unit G4 includes the cemented lens with the biconcave lens $L4_1$ and the biconvex lens $L4_2$, the biconcave lens $L4_3$, the biconvex lens $L4_4$, the biconvex lens $L4_5$, and the biconvex lens $L4_6$, arranged in this order from the object side.

When the magnification is changed from 0.3× to 0.5× in focusing of the infinite object point, the first lens unit G1 is moved toward the image side; the second lens unit G2 is moved toward the object side; the third lens unit G3 is moved toward the image side; and the fourth lens unit G4 is moved, together with the stop S, toward the image side so that the spacing between the third lens unit G3 and the fourth lens unit G4 is slightly widened.

The object-to-image distance where the magnification is changed is constantly maintained.

Subsequently, numerical data of optical members constituting the image forming optical system of the fourth embodiment are listed below.

Numerical data 4

Image height: 5.783

$r_0 = \infty$ (object)
$d_0 = 50.000$
$r_1 = \infty$ (object surface)
$d_1 = D1$
$r_2 = 107.8560$
$d_2 = 7.337$  $n_{e2} = 1.48915$  $v_{e2} = 70.04$
$r_3 = -119.7849$
$d_3 = 3.971$
$r_4 = 454.1088$
$d_4 = 7.857$  $n_{e4} = 1.61639$  $v_{e4} = 44.15$
$r_5 = 49.9355$
$d_5 = 12.309$
$r_6 = 64.2291$
$d_6 = 6.018$  $n_{e6} = 1.43985$  $v_{e6} = 94.53$
$r_7 = 300.8668$
$d_7 = D7$
$r_8 = 126.3256$
$d_8 = 6.000$  $n_{e8} = 1.61639$  $v_{e8} = 44.15$
$r_9 = 56.4062$
$d_9 = 6.775$
$r_{10} = 81.4055$
$d_{10} = 8.793$  $n_{e10} = 1.43985$  $v_{e10} = 94.53$
$r_{11} = -83.1434$
$d_{11} = 1.494$
$r_{12} = -63.8486$
$d_{12} = 7.000$  $n_{e12} = 1.61639$  $v_{e12} = 44.15$
$r_{13} = -133.7944$
$d_{13} = 15.757$
$r_{14} = 330.3809$
$d_{14} = 7.640$  $n_{e14} = 1.43985$  $v_{e14} = 94.53$
$r_{15} = -69.3107$
$d_{15} = D15$ -continued Numerical data 4

$r_{16} = 40.1299$
$r_{17} = 187.3566$
$r_{18} = 24.6796$
$r_{19} = 20.3802$
$r_{20} = 39.2697$
$r_{21} = 16.0804$
$r_{22} = \infty$ (aperture stop)
$r_{23} = -30.0984$
$r_{24} = 23.9795$
$r_{25} = -18.9682$
$r_{26} = -14.1963$
$r_{27} = 101.4717$
$r_{28} = 1012.5847$
$r_{29} = -18.1103$
$r_{30} = 69.9749$
$r_{31} = -123.8898$
$r_{32} = 61.1846$
$r_{33} = -136.6736$
$r_{34} = \infty$
$r_{35} = \infty$
$r_{36} = \infty$
$r_{37} = \infty$ (imaging surface)

$d_{16} = 4.652$, $n_{e16} = 1.69417$, $v_{e16} = 30.83$
$d_{17} = 0.300$
$d_{18} = 9.539$, $n_{e18} = 1.72538$, $v_{e18} = 34.47$
$d_{19} = 1.377$
$d_{20} = 2.000$, $n_{e20} = 1.72538$, $v_{e20} = 34.47$
$d_{21} = D21$
$d_{22} = 3.575$
$d_{23} = 2.000$, $n_{e23} = 1.61669$, $v_{e23} = 44.02$
$d_{24} = 8.757$, $n_{e24} = 1.48915$, $v_{e24} = 70.04$
$d_{25} = 3.837$
$d_{26} = 0.817$, $n_{e26} = 1.61639$, $v_{e26} = 44.15$
$d_{27} = 4.565$
$d_{28} = 8.419$, $n_{e28} = 1.43985$, $v_{e28} = 94.53$
$d_{29} = 0.629$
$d_{30} = 4.880$, $n_{e30} = 1.43985$, $v_{e30} = 94.53$
$d_{31} = 0.928$
$d_{32} = 4.997$, $n_{e32} = 1.43985$, $v_{e32} = 94.53$
$d_{33} = D33$
$d_{34} = 33.000$, $n_{e34} = 1.61173$, $v_{e34} = 46.30$
$d_{35} = 13.200$, $n_{e35} = 1.51825$, $v_{e35} = 63.93$
$d_{36} = 0.500$
$d_{37} = 0.000$

Zoom data

| | 0.3× | 0.4× | 0.5× |
|---|---|---|---|
| D1 | 38.765 | 44.451 | 53.283 |
| D7 | 117.344 | 81.410 | 52.958 |
| D15 | 3.000 | 34.932 | 56.369 |
| D21 | 2.614 | 3.787 | 5.228 |
| D33 | 21.660 | 18.803 | 15.544 |

Condition parameters and others

| Magnification: β | 0.3× | 0.4× | 0.5× |
|---|---|---|---|
| Entrance pupil position: En | 1117.828 | 5171.585 | −1158.986 |
| Object-to-image distance: L | 432.125 | 432.125 | 432.125 |
| \|En\|/L | 2.587 | 11.968 | 2.682 |
| Exit pupil position: Ex | −357.630 | −357.630 | −357.630 |
| \|Ex\|/\|L/β\| | 0.248 | 0.331 | 0.485 |
| F-number: FNO | 3.500 | 3.479 | 3.414 |
| The amount of fluctuation of FNO | | | −0.046 |
| ΔFNO/Δβ | | | −0.228 |
| Radius of curvature on the object side: R3f | | | 40.130 |
| Radius of curvature on the image side: R3b | | | 16.080 |
| \|(R3f + R3b)/(R3f − R3b)\| | | | 2.337 |

Fifth Embodiment

FIGS. 9A, 9B, and 9C show optical arrangements where imaging magnifications are set to 0.3×, 0.4×, and 0.5×, respectively, in the fifth embodiment. FIGS. 10A, 10B, and 10C show aberration characteristics in focusing of an infinite object point where the imaging magnification is set to 0.4× in the fifth embodiment.

The image forming optical system of the fifth embodiment includes the variable magnification optical system Z. In this figure, again, reference symbol P represents a prism, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes a plano-convex lens L1$_1$' with a convex surface on the object side and a flat surface on the image side, the negative meniscus lens L1$_2$' with a convex surface directed toward the object side, and the positive meniscus lens L1$_3$' with a convex surface directed toward the object side, arranged in this order from the object side.

The second lens unit G2 includes the negative meniscus lens L2$_1$ with a convex surface directed toward the object side, the biconvex lens L2$_2$, the negative meniscus lens L2$_3$ with a concave surface directed toward the object side, and the biconvex lens L2$_4$, arranged in this order from the object side.

The third lens unit G3 includes the positive meniscus lens L3$_1$ with a convex surface directed toward the object side, the negative meniscus lens L3$_2$ with a convex surface directed toward the object side, and the negative meniscus lens L3$_3$ with a convex surface directed toward the object side, arranged in this order from the object side.

The fourth lens unit G4 includes the cemented lens with the biconcave lens L4$_1$ and the biconvex lens L4$_2$, the biconcave lens L4$_3$, the biconvex lens L4$_4$, the biconvex lens L4$_5$, and the biconvex lens L4$_6$, arranged in this order from the object side.

When the magnification is changed from 0.3× to 0.5× in focusing of the infinite object point, the first lens unit G1, after being moved once toward the object side, is moved toward the image side; the second lens unit G2 is moved toward the object side; the third lens unit G3 is moved toward the object side so that the spacing between the third lens unit G3 and the fourth lens unit G4 is slightly widened; and the fourth lens unit G4 remains fixed, together with the stop S.

The object-to-image distance where the magnification is changed is constantly maintained.

Subsequently, numerical data of optical members constituting the image forming optical system of the fifth embodiment are listed below.

Numerical data 5

Image height: 5.783

$r_0 = \infty$ (object)
$r_1 = \infty$ (object surface)
$r_2 = 53.6678$ $d_0 = 50.000$
$d_1 = D1$
$d_2 = 7.850$, $n_{e2} = 1.48915$, $v_{e2} = 70.04$ -continued Numerical data 5

| | | | |
|---|---|---|---|
| $r_3 = \infty$ | | | |
| | $d_3 = 0.300$ | | |
| $r_4 = 74.4381$ | | | |
| | $d_4 = 6.000$ | $n_{e4} = 1.61639$ | $\nu_{e4} = 44.15$ |
| $r_5 = 34.5362$ | | | |
| | $d_5 = 8.043$ | | |
| $r_6 = 39.1043$ | | | |
| | $d_6 = 4.857$ | $n_{e6} = 1.43985$ | $\nu_{e6} = 94.53$ |
| $r_7 = 52.1576$ | | | |
| | $d_7 = D7$ | | |
| $r_8 = 149.0540$ | | | |
| | $d_8 = 6.000$ | $n_{e8} = 1.61639$ | $\nu_{e8} = 44.15$ |
| $r_9 = 50.6084$ | | | |
| | $d_9 = 6.908$ | | |
| $r_{10} = 78.4447$ | | | |
| | $d_{10} = 9.096$ | $n_{e10} = 1.43985$ | $\nu_{e10} = 94.53$ |
| $r_{11} = -67.1214$ | | | |
| | $d_{11} = 1.239$ | | |
| $r_{12} = -55.5198$ | | | |
| | $d_{12} = 7.000$ | $n_{e12} = 1.61639$ | $\nu_{e12} = 44.15$ |
| $r_{13} = -130.4767$ | | | |
| | $d_{13} = 17.549$ | | |
| $r_{14} = 526.4312$ | | | |
| | $d_{14} = 10.495$ | $n_{e14} = 1.43985$ | $\nu_{e14} = 94.53$ |
| $r_{15} = -60.7655$ | | | |
| | $d_{15} = D15$ | | |
| $r_{16} = 42.8799$ | | | |
| | $d_{16} = 4.607$ | $n_{e16} = 1.69417$ | $\nu_{e16} = 30.83$ |
| $r_{17} = 241.5957$ | | | |
| | $d_{17} = 0.300$ | | |
| $r_{18} = 24.0062$ | | | |
| | $d_{18} = 9.266$ | $n_{e18} = 1.72538$ | $\nu_{e18} = 34.47$ |
| $r_{19} = 20.0630$ | | | |
| | $d_{19} = 1.423$ | | |
| $r_{20} = 37.0493$ | | | |
| | $d_{20} = 2.000$ | $n_{e20} = 1.72538$ | $\nu_{e20} = 34.47$ |
| $r_{21} = 16.8163$ | | | |
| | $d_{21} = D21$ | | |
| $r_{22} = \infty$ (aperture stop) | | | |
| | $d_{22} = 3.685$ | | |
| $r_{23} = -27.7248$ | | | |
| | $d_{23} = 2.000$ | $n_{e23} = 1.61669$ | $\nu_{e23} = 44.02$ |
| $r_{24} = 25.1231$ | | | |
| | $d_{24} = 5.991$ | $n_{e24} = 1.48915$ | $\nu_{e24} = 70.04$ |
| $r_{25} = -18.8837$ | | | |
| | $d_{25} = 4.943$ | | |
| $r_{26} = -14.1386$ | | | |
| | $d_{26} = 0.553$ | $n_{e26} = 1.61639$ | $\nu_{e26} = 44.15$ |
| $r_{27} = 103.4372$ | | | |
| | $d_{27} = 4.610$ | | |
| $r_{28} = 946.2142$ | | | |
| | $d_{28} = 8.426$ | $n_{e28} = 1.43985$ | $\nu_{e28} = 94.53$ |
| $r_{29} = -18.1453$ | | | |
| | $d_{29} = 0.300$ | | |
| $r_{30} = 79.1515$ | | | |
| | $d_{30} = 7.210$ | $n_{e30} = 1.43985$ | $\nu_{e30} = 94.53$ |
| $r_{31} = -65.2376$ | | | |
| | $d_{31} = 5.640$ | | |
| $r_{32} = 63.0290$ | | | |
| | $d_{32} = 6.581$ | $n_{e32} = 1.43985$ | $\nu_{e32} = 94.53$ |
| $r_{33} = -291.4522$ | | | |
| | $d_{33} = 19.405$ | | |
| $r_{34} = \infty$ | | | |
| | $d_{34} = 33.000$ | $n_{e34} = 1.61173$ | $\nu_{e34} = 46.30$ |
| $r_{35} = \infty$ | | | |
| | $d_{35} = 13.200$ | $n_{e35} = 1.51825$ | $\nu_{e35} = 63.93$ |
| $r_{36} = \infty$ | | | |
| | $d_{36} = 0.500$ | | |
| $r_{37} = \infty$ (imaging surface) | | | |
| | $d_{37} = 0.000$ | | |

Zoom data

| | 0.3× | 0.4× | 0.5× |
|---|---|---|---|
| D1 | 42.960 | 38.372 | 47.817 |
| D7 | 105.480 | 70.527 | 33.769 |
| D15 | 3.000 | 40.551 | 66.211 |
| D21 | 2.679 | 4.670 | 6.322 |

Condition parameters and others

| | | | |
|---|---|---|---|
| Magnification: β | 0.3× | 0.4× | 0.5× |
| Entrance pupil position: En | 1295.110 | 24846.034 | −1103.070 |
| object-to-image distance: L | 423.096 | 423.096 | 423.096 |
| \|En\|/L | 3.061 | 58.724 | 2.607 |
| Exit pupil position: Ex | −366.274 | −366.274 | −366.274 |
| \|Ex\|/\|L/β\| | 0.260 | 0.346 | 0.433 |
| F-number: FNO | 3.500 | 3.500 | 3.500 |
| The amount of fluctuation of FNO | | | 0.000 |
| ΔFNO/Δβ | | | −0.002 |
| Radius of curvature on the object side: R3f | | | 42.880 |
| Radius of curvature on the image side: R3b | | | 16.816 |
| \|(R3f + R3b)/(R3f − R3b)\| | | | 2.290 |

Sixth Embodiment

Figure 11A:
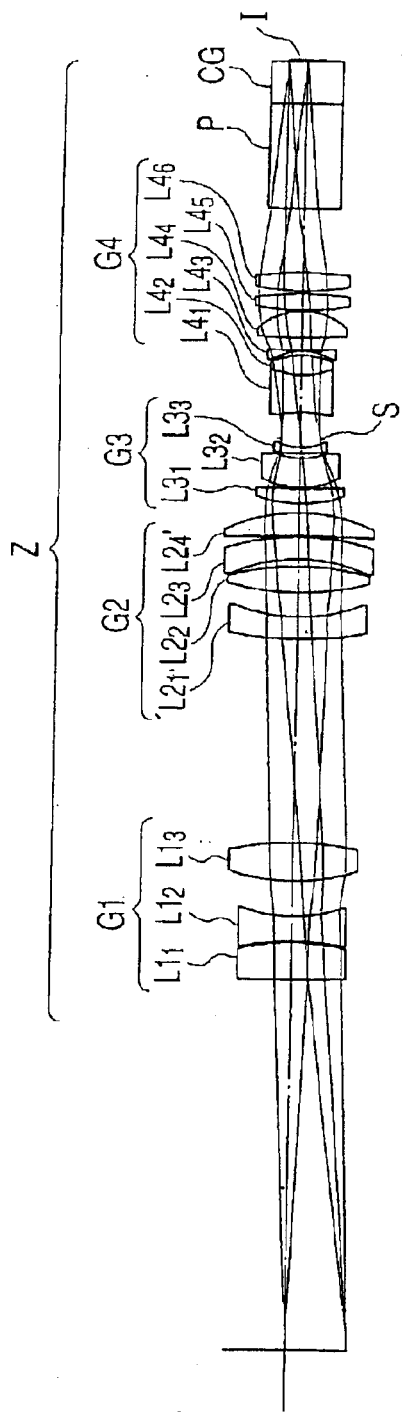
FIG. 11A is a sectional view showing an optical arrangement, developed along the optical axis, where the imaging magnification is set to 0.3× in a sixth embodiment of the image forming optical system according to the present invention.
Figure 11B:
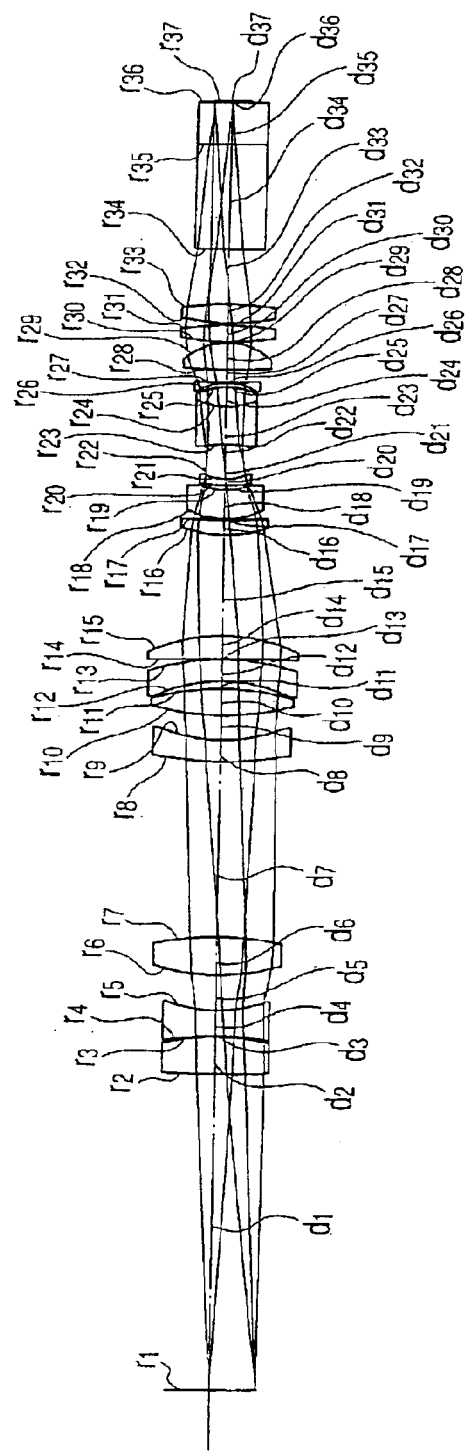
FIG. 11B is a sectional view showing an optical arrangement, developed along the optical axis, where the imaging magnification is set to 0.4× in the sixth embodiment.
Figure 11C:
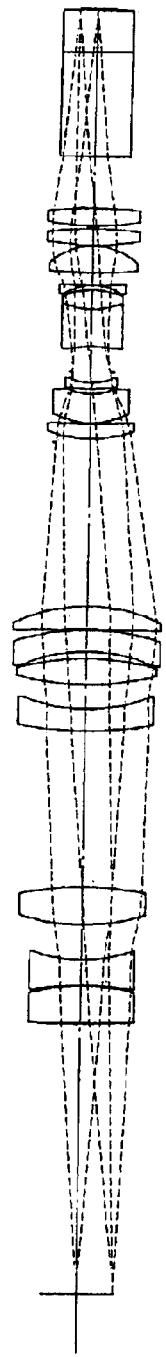
FIG. 11C is a sectional view showing an optical arrangement, developed along the optical axis, where the imaging magnification is set to 0.5× in the sixth embodiment.

FIGS. 11A, 11B, and 11C show optical arrangements where imaging magnifications are set to 0.3×, 0.4×, and 0.5×, respectively, in the sixth embodiment. FIGS. 12A, 12B, and 12C show aberration characteristics in focusing of an infinite object point where the imaging magnification is set to 0.4× in the sixth embodiment.

The image forming optical system of the sixth embodiment includes the variable magnification optical system Z. In this figure, again, reference symbol P represents a prism, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the biconvex lens $L1_1$, the biconcave lens $L1_2$, and the biconvex lens $L1_3$, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, and a positive meniscus lens $L2_4'$ with a concave lens directed toward the object side, arranged in this order from the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side, arranged in this order from the object side.

The fourth lens unit G4 includes the cemented lens with the biconcave lens $L4_1$ and the biconvex lens $L4_2$, the biconcave lens $L4_3$, the biconvex lens $L4_4$, the biconvex lens $L4_5$, and the biconvex lens $L4_6$, arranged in this order from the object side.

When the magnification is changed from 0.3× to 0.5× in focusing of the infinite object point, the first lens unit G1 is moved toward the object side; the second lens unit G2 is moved toward the object side so that spacing between the first lens unit G1 and the second lens unit G2 is widened; the third lens unit G3 is moved, together with the stop S, toward the image side; and the fourth lens unit G4 is moved toward the image side so that the spacing between the third lens unit G3 and the fourth lens unit G4 is slightly widened.

The object-to-image distance where the magnification is changed is constantly maintained.

Subsequently, numerical data of optical members constituting the image forming optical system of the sixth embodiment are listed below.

Numerical data 6

Image height: 5.783

$r_0 = \infty$ (object)
$d_0 = 50.000$
$r_1 = \infty$ (object surface)
$d_1 = D1$
$r_2 = 361.3250$
$d_2 = 12.000$  $n_{e2} = 1.48915$  $\nu_{e2} = 70.04$
$r_3 = -65.3190$
$d_3 = 0.300$
$r_4 = -90.3503$
$d_4 = 8.000$  $n_{e4} = 1.61639$  $\nu_{e4} = 44.15$
$r_5 = 45.5593$
$d_5 = 11.355$
$r_6 = 65.7955$
$d_6 = 12.000$  $n_{e6} = 1.43985$  $\nu_{e6} = 94.53$
$r_7 = -101.4028$
$d_7 = D7$
$r_8 = 113.0032$
$d_8 = 7.000$  $n_{e8} = 1.61639$  $\nu_{e8} = 44.15$
$r_9 = 53.1618$
$d_9 = 7.854$
$r_{10} = 84.6315$
$d_{10} = 8.348$  $n_{e10} = 1.43985$  $\nu_{e10} = 94.53$
$r_{11} = -82.9242$
$d_{11} = 2.346$
$r_{12} = -51.6817$
$d_{12} = 6.901$  $n_{e12} = 1.61639$  $\nu_{e12} = 44.15$
$r_{13} = -78.9538$
$d_{13} = 0.300$
$r_{14} = -746.1406$
$d_{14} = 7.363$  $n_{e14} = 1.43985$  $\nu_{e14} = 94.53$
$r_{15} = -54.9986$
$d_{15} = D15$
$r_{16} = 40.2152$
$d_{16} = 4.672$  $n_{e16} = 1.69417$  $\nu_{e16} = 30.83$
$r_{17} = 202.9669$
$d_{17} = 0.300$
$r_{18} = 25.2156$
$d_{18} = 9.337$  $n_{e18} = 1.72538$  $\nu_{e18} = 34.47$
$r_{19} = 20.5989$
$d_{19} = 1.486$
$r_{20} = 47.2290$
$d_{20} = 2.000$  $n_{e20} = 1.72538$  $\nu_{e20} = 34.47$
$r_{21} = 17.1952$
$d_{21} = D21$
$r_{22} = \infty$ (aperture stop)
$d_{22} = 8.090$
$r_{23} = -31.8155$
$d_{23} = 12.000$  $n_{e23} = 1.61669$  $\nu_{e23} = 44.02$
$r_{24} = 23.4115$
$d_{24} = 6.316$  $n_{e24} = 1.48915$  $\nu_{e24} = 70.04$
$r_{25} = -23.1015$
$d_{25} = 1.525$
$r_{26} = -17.3296$
$d_{26} = 0.137$  $n_{e26} = 1.61639$  $\nu_{e26} = 44.15$
$r_{27} = 121.5936$
$d_{27} = 4.365$
$r_{28} = 236.9154$
$d_{28} = 8.477$  $n_{e28} = 1.43985$  $\nu_{e28} = 94.53$
$r_{29} = -20.8758$
$d_{29} = 0.300$
$r_{30} = 78.3373$
$d_{30} = 5.274$  $n_{e30} = 1.43985$  $\nu_{e30} = 94.53$ -continued Numerical data 6

$r_{31} = -103.6059$
$d_{31} = 0.983$
$r_{32} = 81.5041$
$d_{32} = 5.879$  $n_{e32} = 1.43985$  $\nu_{e32} = 94.53$
$r_{33} = -103.9512$
$d_{33} = D33$
$r_{34} = \infty$
$d_{34} = 33.000$  $n_{e34} = 1.61173$  $\nu_{e34} = 46.30$
$r_{35} = \infty$
$d_{35} = 13.200$  $n_{e35} = 1.51825$  $\nu_{e35} = 63.93$
$r_{36} = \infty$
$d_{36} = 0.500$
$r_{37} = \infty$ (imaging surface)
$d_{37} = 0.000$ Zoom data

|  | 0.3× | 0.4× | 0.5× |
|---|---|---|---|
| D1 | 68.668 | 51.352 | 36.703 |
| D7 | 65.281 | 56.350 | 50.311 |
| D15 | 3.000 | 32.024 | 53.396 |
| D21 | 2.770 | 2.825 | 3.398 |
| D33 | 20.686 | 17.854 | 16.597 |

Condition parameters and others

| Magnification: β | 0.3× | 0.4× | 0.5× |
|---|---|---|---|
| Entrance pupil position: En | 140.733 | 198.229 | 329.610 |
| Object-to-image distance: L | 412.012 | 412.012 | 412.012 |
| \|En\|/L | 0.342 | 0.481 | 0.800 |
| Exit pupil position: Ex | 2022.944 | 2022.944 | 2022.944 |
| \|Ex\|/\|L/β\| | 1.473 | 1.964 | 2.455 |
| F-number: FNO | 3.500 | 3.511 | 3.516 |
| The amount of fluctuation of FNO |  |  | 0.016 |
| ΔFNO/Δβ |  |  | 0.082 |
| Radius of curvature on the object side: R3f |  |  | 40.215 |
| Radius of curvature on the image side: R3b |  |  | 17.195 |
| \|(R3f + R3b)/(R3f − R3b)\| |  |  | 2.494 |

Seventh Embodiment

Figure 13A:
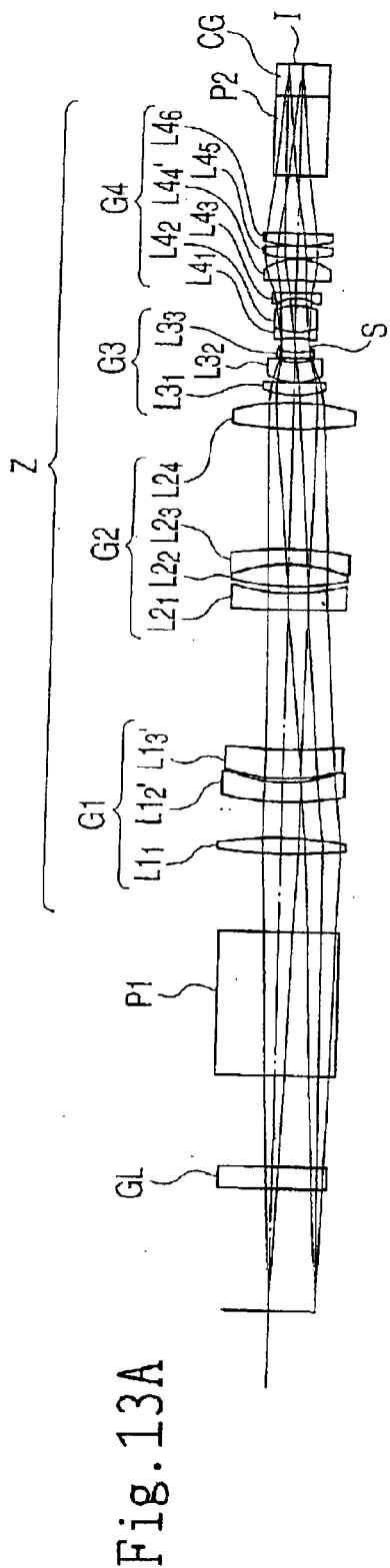
FIG. 13A is a sectional view showing an optical arrangement, developed along the optical axis, where the imaging magnification is set to 0.3× in a seventh embodiment of the image forming optical system according to the present invention.
Figure 13B:
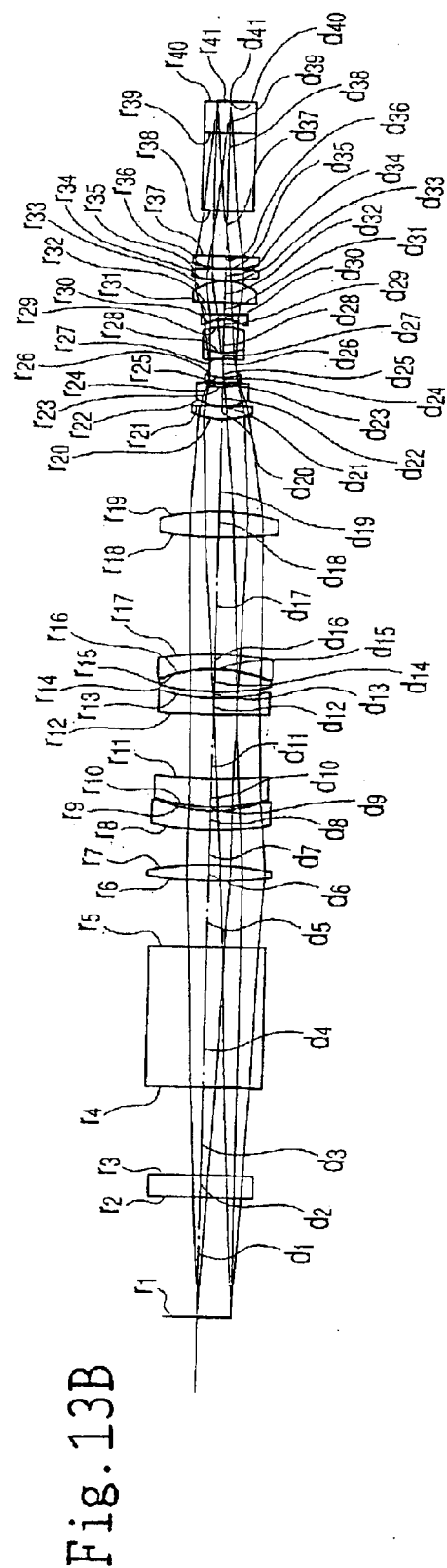
FIG. 13B is a sectional view showing an optical arrangement, developed along the optical axis, where the imaging magnification is set to 0.4× in the seventh embodiment.
Figure 13C:
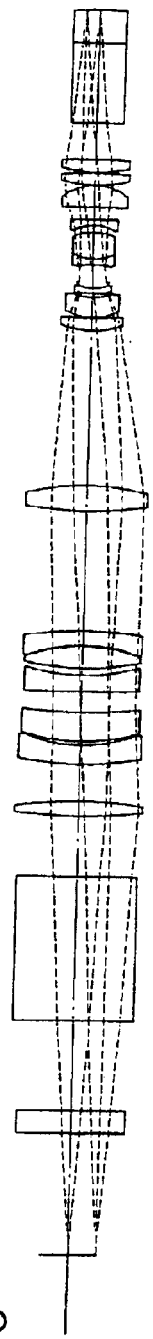
FIG. 13C is a sectional view showing an optical arrangement, developed along the optical axis, where the imaging magnification is set to 0.5× in the seventh embodiment.

FIGS. 13A, 13B, and 13C show optical arrangements where imaging magnifications are set to 0.3×, 0.4×, and 0.5×, respectively, in the seventh embodiment. FIGS. 14A, 14B, and 14C show aberration characteristics in focusing of an infinite object point where the imaging magnification is set to 0.4× in the seventh embodiment.

The image forming optical system of the seventh embodiment includes the variable magnification optical system Z. In this figure, reference symbol GL represents a plane-parallel plate, P1 and P2 represent prisms, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the biconvex lens L1$_1$, the negative meniscus lens L1$_2$' with a convex surface directed toward the object side, and the positive meniscus lens L1$_3$' with a convex surface directed toward the object side, arranged in this order from the object side.

The second lens unit G2 includes the negative meniscus lens L2$_1$ with a convex surface directed toward the object side, the biconvex lens L2$_2$, the negative meniscus lens L2$_3$ with a concave surface directed toward the object side, and the biconvex lens L2$_4$, arranged in this order from the object side.

The third lens unit G3 includes the positive meniscus lens $L3_1$ with a convex surface directed toward the object side, the negative meniscus lens $L3_2$ with a convex surface directed toward the object side, and the negative meniscus lens $L3_3$ with a convex surface directed toward the object side, arranged in this order from the object side.

The fourth lens unit G4 includes the cemented lens with the biconcave lens $L4_1$ and the biconvex lens $L4_2$, the biconcave lens $L4_3$, a positive meniscus lens $L4_4$' with a concave surface directed toward the object side, the biconvex lens $L4_5$, and the biconvex lens $L4_6$, arranged in this order from the object side.

When the magnification is changed from 0.3× to 0.5× in focusing of the infinite object point, the first lens unit G1 is moved toward the object side; the second lens unit G2 is moved toward the object side so that the spacing between the first lens unit G1 and the second lens unit G2 is narrowed; the third lens unit G3 is moved, together with the stop S, toward the image side; and the fourth lens unit G4 is moved toward the image side so that the spacing between the third lens unit G3 and the fourth lens unit G4 is slightly widened.

The object-to-image distance where the magnification is changed is constantly maintained.

Subsequently, numerical data of optical members constituting the image forming optical system of the seventh embodiment are listed below.

Numerical data 7

Image height: 5.783

$r_0 = \infty$ (object)
$d_0 = 51.000$
$r_1 = \infty$ (object surface)
$d_1 = 9.260$  $n_{e1} = 1.51825$  $\nu_{e1} = 63.93$
$r_2 = \infty$
$d_2 = 2.740$
$r_3 = \infty$
$d_3 = 35.000$
$r_4 = \infty$
$d_4 = 60.000$  $n_{e4} = 1.51825$  $\nu_{e4} = 63.93$
$r_5 = \infty$
$d_5 = D5$
$r_6 = 206.3131$
$d_6 = 6.508$  $n_{e6} = 1.48915$  $\nu_{e6} = 70.04$
$r_7 = -156.0897$
$d_7 = 15.114$
$r_8 = 130.1657$
$d_8 = 8.000$  $n_{e8} = 1.61639$  $\nu_{e8} = 44.15$
$r_9 = 61.3830$
$d_9 = 1.693$
$r_{10} = 80.8720$
$d_{10} = 12.000$  $n_{e10} = 1.43985$  $\nu_{e10} = 94.53$
$r_{11} = 232.8980$
$d_{11} = D11$
$r_{12} = 672.7620$
$d_{12} = 6.836$  $n_{e12} = 1.61639$  $\nu_{e12} = 44.15$
$r_{13} = 82.8549$
$d_{13} = 2.818$
$r_{14} = 110.5678$
$d_{14} = 9.282$  $n_{e14} = 1.43985$  $\nu_{e14} = 94.53$
$r_{15} = -65.4332$
$d_{15} = 0.300$
$r_{16} = -67.0268$
$d_{16} = 6.107$  $n_{e16} = 1.61639$  $\nu_{e16} = 44.15$
$r_{17} = -156.9702$
$d_{17} = 50.171$
$r_{18} = 160.2358$
$d_{18} = 10.874$  $n_{e18} = 1.43985$  $\nu_{e18} = 94.53$
$r_{19} = -98.7058$
$d_{19} = D19$

Numerical data 7 -continued $r_{20} = 37.4259$
$d_{20} = 5.034$  $n_{e20} = 1.69417$  $\nu_{e20} = 30.83$
$r_{21} = 212.9113$
$d_{21} = 0.300$
$r_{22} = 22.9775$
$d_{22} = 8.363$  $n_{e22} = 1.72538$  $\nu_{e22} = 34.47$
$r_{23} = 18.2286$
$d_{23} = 1.827$
$r_{24} = 101.2051$
$d_{24} = 2.247$  $n_{e24} = 1.72538$  $\nu_{e24} = 34.47$
$r_{25} = 17.6992$
$d_{25} = 2.554$
$r_{26} = \infty$ (開口絞り)
$d_{26} = D26$
$r_{27} = -55.3149$
$d_{27} = 2.589$  $n_{e27} = 1.61669$  $\nu_{e27} = 44.02$
$r_{28} = 20.3875$
$d_{28} = 11.136$  $n_{e28} = 1.48915$  $\nu_{e28} = 70.04$
$r_{29} = -22.7793$
$d_{29} = 2.967$
$r_{30} = -17.4070$
$d_{30} = 2.255$  $n_{e30} = 1.61639$  $\nu_{e30} = 44.15$
$r_{31} = 660.0000$
$d_{31} = 5.164$
$r_{32} = -361.4116$
$d_{32} = 9.280$  $n_{e32} = 1.43985$  $\nu_{e32} = 94.53$
$r_{33} = -21.6618$
$d_{33} = 0.300$
$r_{34} = 57.4166$
$d_{34} = 5.104$  $n_{e34} = 1.43985$  $\nu_{e34} = 94.53$
$r_{35} = -177.5066$
$d_{35} = 0.350$
$r_{36} = 61.7155$
$d_{36} = 4.849$  $n_{e36} = 1.43985$  $\nu_{e36} = 94.53$
$r_{37} = -672.7620$
$d_{37} = D37$
$r_{38} = \infty$
$d_{38} = 33.000$  $n_{e38} = 1.61173$  $\nu_{e38} = 46.30$
$r_{39} = \infty$
$d_{39} = 13.200$  $n_{e39} = 1.51825$  $\nu_{e39} = 63.93$
$r_{40} = \infty$
$d_{40} = 0.500$
$r_{41} = \infty$ (imaging plane)
$d_{41} = 0.000$

Zoom data

| | 0.3× | 0.4× | 0.5× |
|---|---|---|---|
| D5 | 32.142 | 28.009 | 24.962 |
| D11 | 58.194 | 27.683 | 8.473 |
| D19 | 3.000 | 39.963 | 64.634 |
| D26 | 3.340 | 5.440 | 7.048 |
| D37 | 23.777 | 19.357 | 15.336 |

Condition parameters and others

| Magnification: β | 0.3× | 0.4× | 0.5× |
|---|---|---|---|
| Entrance pupil position: En | 1215.330 | 17052.978 | −1195.682 |
| Object-to-image distance: L | 467.675 | 467.675 | 467.675 |
| \|En\|/L | 2.599 | 36.463 | 2.557 |
| Exit pupil position: Ex | −361.027 | −890.944 | −13016.681 |
| \|Ex\|/L/β | 0.232 | 0.762 | 13.916 |
| F-number: FNO | 3.500 | 3.517 | 3.556 |
| The amount of fluctuation of FNO | | | 0.056 |
| ΔFNO/Δβ | | | 0.280 |
| Radius of curvature on the object side: R3f | | | 37.426 |
| Radius of curvature on the image side: R3b | | | 17.699 |
| \|(R3f + R3b)/(R3f − R3b)\| | | | 2.794 |

Eighth Embodiment

FIGS. 15A, 15B, and 15C show optical arrangements where imaging magnifications are set to 0.3×, 0.4×, and 0.5×, respectively, in the eighth embodiment. FIGS. 16A, 16B, and 16C show aberration characteristics in focusing of an infinite object point where the imaging magnification is set to 0.4× in the eighth embodiment.

The image forming optical system of the eighth embodiment includes the variable magnification optical system Z. In this figure, again, reference symbol GL represents a plane-parallel plate, P1 and P2 represent prisms, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes a positive meniscus lens $L1_1''$ with a concave surface directed toward the object side, the negative meniscus lens $L1_2'$ with a concave surface directed toward the object side, and the biconvex lens $L1_3$, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, a positive meniscus lens $L2_4'$ with a concave surface directed toward the object side, and a positive meniscus lens $L2_5$ with a convex surface directed toward the object side, arranged in this order from the object side.

The third lens unit G3 includes a biconvex lens $L3_1'$, the negative meniscus lens $L3_2$ with a convex surface directed toward the object side, and the negative meniscus lens $L3_3$ with a convex surface directed toward the object side, arranged in this order from the object side.

The fourth lens unit G4 includes a negative meniscus lens $L4_1'$ with a convex surface directed toward the object side, a positive meniscus lens $L4_2'$ with a concave surface directed toward the object side, a negative meniscus lens $L4_3'$ with a concave surface directed toward the object side, the positive meniscus lens $L4_4'$ with a concave surface directed toward the object side, the biconvex lens $L4_5$, and a positive meniscus lens $L4_6'$ with a convex surface directed toward the object side, arranged in this order from the object side.

When the magnification is changed from 0.3× to 0.5× in focusing of the infinite object point, the first lens unit G1 is moved toward the object side; the second lens unit G2 is moved toward the object side so that the spacing between the first lens unit G1 and the second lens unit G2 is widened; the third lens unit G3 is moved, together with the stop S, toward the object side so that spacing between the second lens unit G2 and the third lens unit G3 is slightly widened; and the fourth lens unit G4, after being slightly moved once toward the image side, is slightly moved toward the object side.

The object-to-image distance where the magnification is changed is constantly maintained.

Subsequently, numerical data of optical members constituting the image forming optical system of the eighth embodiment are listed below.

Numerical data 8

Image height: 5.783

$r_0 = \infty$ (object)
$d_0 = 51.000$
$r_1 = \infty$ (object surface)
$d_1 = 9.260$  $n_{e1} = 1.51825$  $\nu_{e1} = 63.93$
$r_2 = \infty$
$d_2 = 2.740$
$r_3 = \infty$
$d_3 = 35.000$
$r_4 = \infty$
$d_4 = 60.000$  $n_{e4} = 1.51825$  $\nu_{e4} = 63.93$
$r_5 = \infty$
$d_5 = D5$
$r_6 = -218.393$
$d_6 = 11.966$  $n_{e6} = 1.48915$  $\nu_{e6} = 70.04$
$r_7 = -59.981$
$d_7 = 0.724$
$r_8 = -58.074$
$d_8 = 8.000$  $n_{e8} = 1.61639$  $\nu_{e8} = 44.15$
$r_9 = -192.015$
$d_9 = 0.300$
$r_{10} = 453.258$
$d_{10} = 11.399$  $n_{e10} = 1.43985$  $\nu_{e10} = 94.53$
$r_{11} = -95.008$
$d_{11} = D11$
$r_{12} = 111.240$
$d_{12} = 6.982$  $n_{e12} = 1.61639$  $\nu_{e12} = 44.15$
$r_{13} = 49.021$
$d_{13} = 0.808$
$r_{14} = 52.125$
$d_{14} = 6.307$  $n_{e14} = 1.43985$  $\nu_{e14} = 94.53$
$r_{15} = -602.409$
$d_{15} = 3.345$
$r_{16} = -51.702$
$d_{16} = 7.000$  $n_{e16} = 1.61639$  $\nu_{e16} = 44.15$
$r_{17} = -123.131$
$d_{17} = 0.300$
$r_{18} = -267.367$
$d_{18} = 5.244$  $n_{e18} = 1.43985$  $\nu_{e18} = 94.53$
$r_{19} = -59.230$
$d_{19} = 0.300$
$r_{20} = 62.890$
$d_{20} = 5.562$  $n_{e20} = 1.43985$  $\nu_{e20} = 94.53$
$r_{21} = 208.855$
$d_{21} = D21$
$r_{22} = 109.670$
$d_{22} = 4.560$  $\nu_{e22} = 1.67765$  $\nu_{e22} = 31.84$
$r_{23} = -261.555$
$d_{23} = 4.236$
$r_{24} = 27.656$
$d_{24} = 9.660$  $n_{e24} = 1.83945$  $\nu_{e24} = 42.47$
$r_{25} = 22.416$
$d_{25} = 3.719$
$r_{26} = 591.785$
$d_{26} = 2.000$  $n_{e26} = 1.83945$  $\nu_{e26} = 42.47$
$r_{27} = 32.027$
$d_{27} = 2.504$
$r_{28} = \infty$ (aperture stop)
$d_{28} = D28$
$r_{29} = 235.972$
$d_{29} = 3.058$  $n_{e29} = 1.61639$  $\nu_{e29} = 44.15$
$r_{30} = 39.062$
$d_{30} = 3.236$
$r_{31} = -23.495$
$d_{31} = 6.117$  $n_{e31} = 1.43985$  $\nu_{e31} = 94.53$
$r_{32} = -17.821$
$d_{32} = 0.300$
$r_{33} = -18.080$
$d_{33} = 4.802$  $n_{e33} = 1.61639$  $\nu_{e33} = 44.15$
$r_{34} = -31.126$
$d_{34} = 0.300$
$r_{35} = -67.557$
$d_{35} = 4.329$  $n_{e35} = 1.43985$  $\nu_{e35} = 94.53$
$r_{36} = -32.513$
$d_{36} = 0.300$ -continued Numerical data 8

$r_{37} = 81.623$
$d_{37} = 4.159$  $n_{e37} = 1.43985$  $v_{e37} = 94.53$
$r_{38} = -357.038$
$d_{38} = 0.484$
$r_{39} = 34.763$
$d_{39} = 5.000$  $n_{e39} = 1.43985$  $v_{e39} = 94.53$
$r_{40} = 244.020$
$d_{40} = D40$
$r_{41} = \infty$
$d_{41} = 33.000$  $n_{e41} = 1.61173$  $v_{e41} = 46.30$
$r_{42} = \infty$
$d_{42} = 13.200$  $n_{e42} = 1.51825$  $v_{e42} = 63.93$
$r_{43} = \infty$
$d_{43} = 0.500$
$r_{44} = \infty$ (imaging plane)
$d_{44} = 0$ Zoom data

|  | 0.3× | 0.4× | 0.5× |
|---|---|---|---|
| D5 | 193.324 | 142.895 | 90.403 |
| D11 | 3.000 | 43.660 | 80.930 |
| D21 | 3.160 | 6.077 | 8.978 |
| D28 | 20.516 | 27.628 | 34.649 |
| D40 | 11.289 | 11.032 | 16.330 |

Condition parameters and others

| Magnification: β | 0.3× | 0.4× | 0.5× |
|---|---|---|---|
| Entrance pupil position: En | 89.768 | 209.179 | 450.391 |
| Object-to-image distance: L | 562.991 | 562.991 | 562.991 |
| \|En\|/L | 0.159 | 0.372 | 0.800 |
| Exit pupil position: Ex | −355.985 | −5834.634 | 634.502 |
| \|Ex\|/\|L/β\| | 0.190 | 4.145 | 0.564 |
| F-number: FNO | 3.500 | 3.789 | 4.037 |
| The amount of fluctuation of FNO |  |  | 0.537 |
| ΔFNO/Δβ |  |  | 2.685 |
| Radius of curvature on the object side: R3f |  |  | 109.670 |
| Radius of curvature on the image side: R3b |  |  | 32.027 |
| \|(R3f + R3b)/(R3f − R3b)\| |  |  | 1.825 |

Ninth Embodiment

Figure 17A:
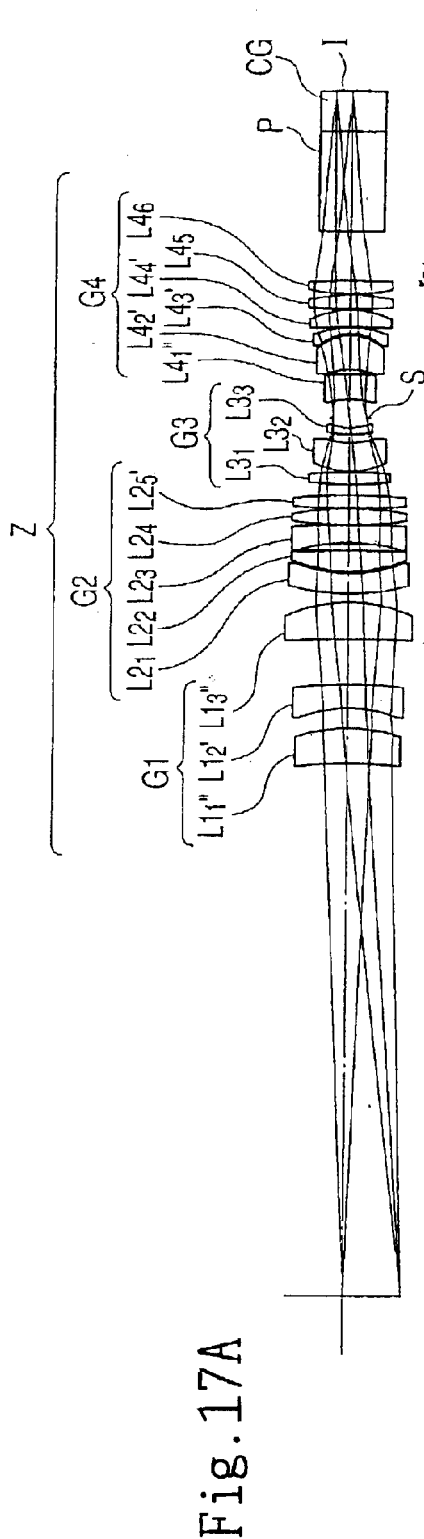
FIG. 17A is a sectional view showing an optical arrangement, developed along the optical axis, where the imaging magnification is set to 0.3× in a ninth embodiment of the image forming optical system according to the present invention.
Figure 17B:
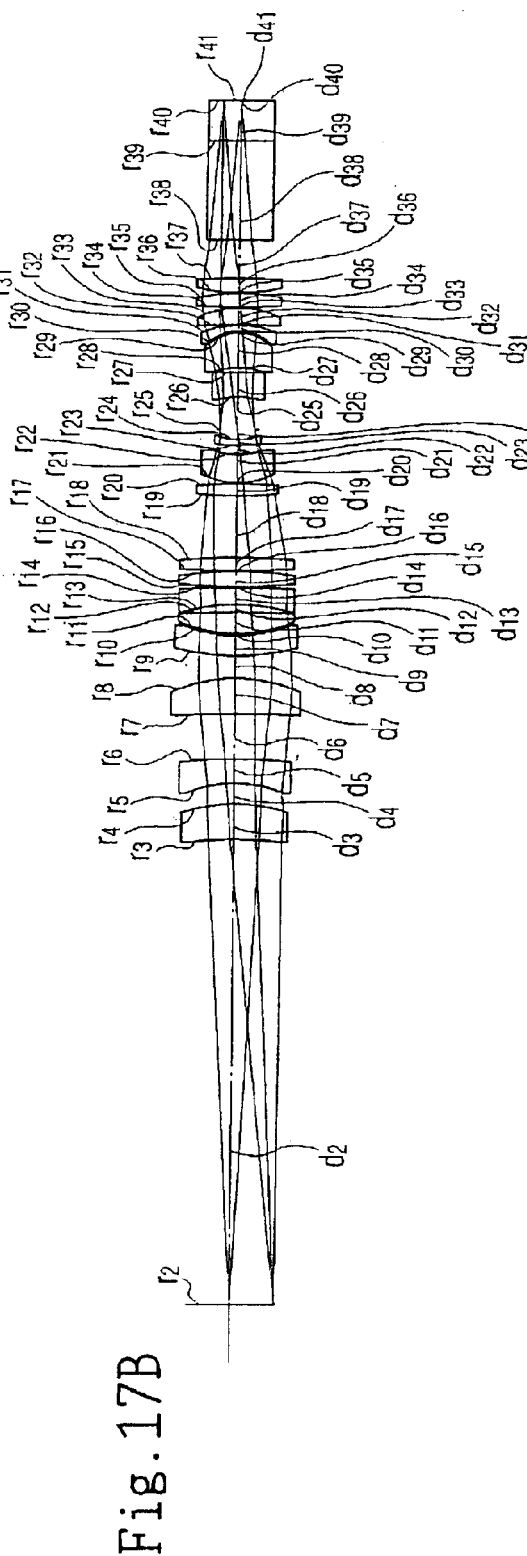
FIG. 17B is a sectional view showing an optical arrangement, developed along the optical axis, where the imaging magnification is set to 0.4× in the ninth embodiment.
Figure 17C:
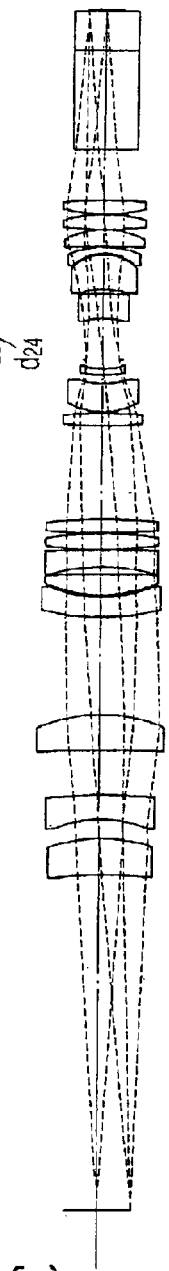
FIG. 17C is a sectional view showing an optical arrangement, developed along the optical axis, where the imaging magnification is set to 0.5× in the ninth embodiment.

FIGS. 17A, 17B, and 17C show optical arrangements where imaging magnifications are set to 0.3×, 0.4×, and 0.5×, respectively, in the ninth embodiment. FIGS. 18A, 18B, and 18C show aberration characteristics in focusing of an infinite object point where the imaging magnification is set to 0.4× in the ninth embodiment.

The image forming optical system of the ninth embodiment includes the variable magnification optical system Z. In this figure, again, reference symbol GL represents a plane-parallel plate, P1 and P2 represent prisms, CG represents a glass cover, and I represents an imaging plane.

The variable magnification optical system Z comprises, in order form the object side toward the image side, the first lens unit G1 with positive refracting power, the second lens unit G2 with positive refracting power, the third lens unit G3 with negative refracting power, the aperture stop S, and the fourth lens unit G4 with positive refracting power.

The first lens unit G1 includes the positive meniscus lens $L1_1''$ with a concave surface directed toward the object side, the negative meniscus lens $L1_2'$ with a concave surface directed toward the object side, and a positive meniscus lens $L1_3''$ with a concave surface directed toward the object side, arranged in this order from the object side.

The second lens unit G2 includes the negative meniscus lens $L2_1$ with a convex surface directed toward the object side, the biconvex lens $L2_2$, the negative meniscus lens $L2_3$ with a concave surface directed toward the object side, the biconvex lens $L2_4$, and a biconvex lens $L2_5'$, arranged in this order from the object side.

The third lens unit G3 includes the biconvex lens $L3_1$, the negative meniscus lens $L3_2$ with a convex surface directed toward the object side, and the negative meniscus lens $L3_3$ with a convex surface directed toward the object side, arranged in this order from the object side.

The fourth lens unit G4 includes a negative meniscus lens $L4_1''$ with a concave surface directed toward the object side, the positive meniscus lens $L4_2'$ with a concave surface directed toward the object side, the negative meniscus lens $L4_3'$ with a concave surface directed toward the object side, the positive meniscus lens $L4_4'$ with a concave surface directed toward the object side, the biconvex lens $L4_5$, and the biconvex lens $L4_6$, arranged in this order from the object side.

When the magnification is changed from 0.3× to 0.5× in focusing of the infinite object point, the first lens unit G1 is moved toward the object side; the second lens unit G2 is moved toward the object side so that the spacing between the first lens unit G1 and the second lens unit G2 is widened; the third lens unit G3 is moved, together with the stop S, toward the object side so that the spacing between the second lens unit G2 and the third lens unit G3 is widened; and the fourth lens unit G4, after being slightly moved once toward the image side, is slightly moved toward the object side.

The object-to-image distance where the magnification is changed is constantly maintained.

Subsequently, numerical data of optical members constituting the image forming optical system of the ninth embodiment are listed below.

Numerical data 9

Image height: 5.783

$r_0 = \infty$ (object)
$d_0 = 21.000$
$r_1 = \infty$ (object)
$d_1 = 26.161$
$r_2 = \infty$ (object surface)
$d_2 = D2$
$r_3 = -153.3010$
$d_3 = 12.000$  $n_{e3} = 1.48915$  $v_{e3} = 70.04$
$r_4 = -56.0044$
$d_4 = 6.782$
$r_5 = -42.5771$
$d_5 = 8.000$  $n_{e6} = 1.61639$  $v_{e5} = 44.15$
$r_6 = -173.4981$
$d_6 = 15.255$
$r_7 = -454.5776$
$d_7 = 12.000$  $n_{e7} = 1.43985$  $v_{e7} = 94.53$
$r_8 = -54.2450$
$d_8 = D8$
$r_9 = 74.1238$
$d_9 = 7.000$  $n_{e9} = 1.61639$  $v_{e9} = 44.15$
$r_{10} = 47.9620$
$d_{10} = 0.782$
$r_{11} = 50.6461$
$d_{11} = 6.639$  $n_{e11} = 1.43985$  $v_{e11} = 94.53$
$r_{12} = -395.4325$
$d_{12} = 2.526$
$r_{13} = -67.4730$
$d_{13} = 6.000$  $n_{e13} = 1.61639$  $v_{e13} = 44.15$
$r_{14} = -489.0704$
$d_{14} = 0.300$
$r_{15} = 162.7339$
$d_{15} = 5.252$  $n_{e15} = 1.43985$  $v_{e15} = 94.53$ -continued Numerical data 9

$r_{16} = -122.6735$
$d_{16} = 0.300$
$r_{17} = 377.7299$
$d_{17} = 4.142$   $n_{e17} = 1.43985$   $v_{e17} = 94.53$
$r_{18} = -202.1041$
$d_{18} = D18$
$r_{19} = 108.3047$
$d_{19} = 4.106$   $n_{e19} = 1.67765$   $v_{e19} = 31.84$
$r_{20} = -192.0405$
$d_{20} = 0.454$
$r_{21} = 25.9085$
$d_{21} = 9.623$   $n_{e21} = 1.83945$   $v_{e21} = 42.47$
$r_{22} = 24.8614$
$d_{22} = 2.939$
$r_{23} = 50.8391$
$d_{23} = 2.000$   $n_{e23} = 1.83945$   $v_{e23} = 42.47$
$r_{24} = 18.5107$
$d_{24} = 3.223$
$r_{25} = \infty$ (aperture stop)
$d_{25} = D25$
$r_{26} = -23.8975$
$d_{26} = 8.198$   $n_{e26} = 1.61639$   $v_{e26} = 44.15$
$r_{27} = -142.2318$
$d_{27} = 1.569$
$r_{28} = -27.6769$
$d_{28} = 12.000$   $n_{e28} = 1.43985$   $v_{e28} = 94.53$
$r_{29} = -15.4629$
$d_{29} = 0.617$
$r_{30} = -15.4255$
$d_{30} = 2.000$   $n_{e30} = 1.61639$   $v_{e30} = 44.15$
$r_{31} = -31.9175$
$d_{31} = 0.300$
$r_{32} = -193.4359$
$d_{32} = 5.561$   $n_{e32} = 1.43985$   $v_{e32} = 94.53$
$r_{33} = -30.6965$
$d_{33} = 0.300$
$r_{34} = 190.3831$
$d_{34} = 4.818$   $n_{e34} = 1.43985$   $v_{e34} = 94.53$
$r_{35} = -61.6979$
$d_{35} = 0.300$
$r_{36} = 63.1906$
$d_{36} = 4.652$   $n_{e36} = 1.43985$   $v_{e36} = 94.53$
$r_{37} = -264.7349$
$d_{37} = D37$
$r_{38} = \infty$
$d_{38} = 33.000$   $n_{e38} = 1.61173$   $v_{e38} = 46.30$ -continued Numerical data 9

$r_{39} = \infty$
$d_{39} = 13.200$   $n_{e39} = 1.51825$   $v_{e39} = 63.93$
$r_{40} = \infty$
$d_{40} = 0.500$
$r_{41} = \infty$ (imaging plane)
$d_{41} = 0.000$ Zoom data

|  | 0.3× | 0.4× | 0.5× |
|---|---|---|---|
| D2 | 131.948 | 109.433 | 66.283 |
| D8 | 3.000 | 7.576 | 32.565 |
| D18 | 3.338 | 20.375 | 31.678 |
| D25 | 6.470 | 11.057 | 13.774 |
| D37 | 16.892 | 13.207 | 17.349 |

Condition parameters and others

| Magnification: β | 0.3× | 0.4× | 0.5× |
|---|---|---|---|
| Entrance pupil position: En | 104.859 | 165.265 | 302.380 |
| Object-to-image distance: L | 405.147 | 405.147 | 405.147 |
| \|En\|/L | 0.259 | 0.408 | 0.746 |
| Exit pupil position: Ex | −368.020 | 2564.601 | 598.424 |
| \|Ex\|/\|L/β\| | 0.273 | 2.532 | 0.739 |
| F-number: FNO | 3.500 | 3.725 | 3.839 |
| The amount of fluctuation of FNO | | | 0.339 |
| ΔFNO/Δβ | | | 1.693 |
| Radius of curvature on the object side: R3f | | | 108.305 |
| Radius of curvature on the image side: R3b | | | 18.511 |
| \|(R3f + R3b)/(R3f − R3b)\| | | | 1.412 |

Subsequently, in the above embodiments, the parameter values of the conditions and whether the lens arrangements satisfy the requirements of the present invention are shown in Tables 1–3.

TABLE 1

|  | 1st embodiment | 2nd embodiment | 3rd embodiment |
|---|---|---|---|
| Object-side telecentricity \|En\|/L (β = 0.3) | 2.71 | 2.62 | 2.96 |
| Object-side telecentricity \|En\|/L (β = 0.4) | 47.27 | 38.41 | 42.84 |
| Object-side telecentricity \|En\|/L (β = 0.5) | 2.65 | 2.66 | 2.55 |
| Image-side telecentricity \|En\|/\|L/β\| (β = 0.3) | 0.25 | 0.25 | 0.25 |
| Image-side telecentricity \|En\|/\|L/β\| (β = 0.4) | 0.54 | 0.69 | 0.84 |
| Image-side telecentricity \|En\|/\|L/β\| (β = 0.5) | 2.12 | 28.49 | 5.62 |
| Conditions (1) and (2) | ◯ | ◯ | ◯ |
| Conditions (1') and (2') | ◯ | ◯ | ◯ |
| Conditions (1") and (2") | ◯ | ◯ | ◯ |
| Difference in object-to-image distance between 0.3× and 0.5× | 0.00000 | 0.00002 | 0.00000 |
| Smallest object-side F-number, MAXFNO | 3.5 | 3.5 | 3.5 |
| \|ΔFNO/Δβ\| | 0.49 | 0.729 | 0.935 |
| Conditions (3) and (4) | ◯ | ◯ | ◯ |

TABLE 1-continued

|  | 1st embodiment | 2nd embodiment | 3rd embodiment |
|---|---|---|---|
| Conditions (3') and (4') | ○ | ○ | ○ |
| Conditions (3") and (4") | ○ | ○ | ○ |
| Lens arrangement of 1st lens unit: positive | ○ | ○ | ○ |
| Lens arrangement of 1st lens unit: positive, negative | ○ | ○ | ○ |
| Lens arrangement of 1st lens unit: positive, negative, positive | ○ | ○ | ○ |
| 3rd lens unit virtual shape factor $|(R3f + R3b)|/|(R3f - R3b)|$ | 2.27 | 2.69 | 2.32 |
| Condition (5) | ○ | ○ | ○ |
| Condition (5') | ○ | ○ | ○ |
| Condition (5") | ○ | ○ | ○ |
| 3rd lens unit: at least two meniscus lenses, each with a convex surface directed toward the object side | ○ | ○ | ○ |
| 3rd lens unit: at least three meniscus lenses, each with a convex surface directed toward the object side | ○ | ○ | ○ |

Note:
○ indicates that conditions are satisfied.

TABLE 2

|  | 4th embodiment | 5th embodiment | 6th embodiment |
|---|---|---|---|
| Object-side telecentricity $|En|/L$ ($\beta = 0.3$) | 2.59 | 3.06 | 0.34 |
| Object-side telecentricity $|En|/L$ ($\beta = 0.4$) | 11.97 | 58.72 | 0.48 |
| Object-side telecentricity $|En|/L$ ($\beta = 0.5$) | 2.68 | 2.61 | 0.80 |
| Image-side telecentricity $|En|/L/\beta|$ ($\beta = 0.3$) | 0.25 | 0.26 | 1.47 |
| Image-side telecentricity $|En|/L/\beta|$ ($\beta = 0.4$) | 0.33 | 0.35 | 1.96 |
| Image-side telecentricity $|En|/L/\beta|$ ($\beta = 0.5$) | 0.41 | 0.43 | 2.46 |
| Conditions (1) and (2) | ○ | ○ | ○ |
| Conditions (1') and (2') | X | X | ○ |
| Conditions (1") and (2") | X | X | X |
| Difference in object-to-image distance between 0.3× and 0.5× | 0.00000 | 0.00000 | 0.00000 |
| Smallest object-side F-number, MAXFNO | 3.45 | 3.5 | 3.5 |
| $|\Delta FNO/\Delta\beta|$ | 0.228 | 0.002 | 0.082 |
| Conditions (3) and (4) | ○ | ○ | ○ |
| Conditions (3') and (4') | ○ | ○ | ○ |
| Conditions (3") and (4") | ○ | ○ | ○ |
| Lens arrangement of 1st lens unit: positive | ○ | ○ | ○ |
| Lens arrangement of 1st lens unit: positive, negative | ○ | ○ | ○ |
| Lens arrangement of 1st lens unit: positive, negative, positive | ○ | ○ | ○ |
| 3rd lens unit virtual shape factor $|(R3f + R3b)|/|(R3f - R3b)|$ | 2.34 | 2.29 | 2.494 |
| Condition (5) | ○ | ○ | ○ |
| Condition (5') | ○ | ○ | ○ |
| Condition (5") | ○ | ○ | ○ |
| 3rd lens unit: at least two meniscus lenses, each with a convex surface directed toward the object side | ○ | ○ | ○ |
| 3rd lens unit: at least three meniscus lenses, each with a convex surface directed toward the object side | ○ | ○ | ○ |

Note:
○ indicates that conditions are satisfied.
X indicated that conditions are not satisfied.

TABLE 3

|  | 7th embodiment | 8th embodiment | 9th embodiment |
|---|---|---|---|
| Object-side telecentricity $|En|/L$ ($\beta = 0.3$) | 2.60 | 0.16 | 0.26 |
| Object-side telecentricity $|En|/L$ ($\beta = 0.4$) | 34.46 | 0.37 | 0.41 |
| Object-side telecentricity $|En|/L$ ($\beta = 0.5$) | 2.56 | 0.80 | 0.75 |
| Image-side telecentricity $|En|/L/\beta|$ ($\beta = 0.3$) | 0.23 | 0.19 | 0.27 |
| Image-side telecentricity $|En|/L/\beta|$ ($\beta = 0.4$) | 0.76 | 4.15 | 2.53 |
| Image-side telecentricity $|En|/L/\beta|$ ($\beta = 0.5$) | 13.92 | 0.56 | 0.74 |
| Conditions (1) and (2) | ○ | ○ | ○ |
| Conditions (1') and (2') | ○ | X | X |
| Conditions (1") and (2") | ○ | X | X |
| Difference in object-to-image distance between 0.3× and 0.5× | 0.00000 | 0.00000 | 0.00000 |
| Smallest object-side F-number, MAXFNO | 3.51 | 3.5 | 3.5 |
| $|\Delta FNO/\Delta\beta|$ | 0.304 | 2.685 | 1.693 |
| Conditions (3) and (4) | ○ | ○ | ○ |
| Conditions (3') and (4') | ○ | ○ | ○ |
| Conditions (3") and (4") | ○ | X | X |
| Lens arrangement of 1st lens unit: positive | ○ | ○ | ○ |

TABLE 3-continued

|  | 7th embodiment | 8th embodiment | 9th embodiment |
|---|---|---|---|
| Lens arrangement of 1st lens unit: positive, negative | ◯ | ◯ | ◯ |
| Lens arrangement of 1st lens unit: positive, negative, positive | ◯ | ◯ | ◯ |
| 3rd lens unit virtual shape factor $|(R3f + R3b)|/|(R3f - R3b)|$ | 2.69 | 1.83 | 1.41 |
| Condition (5) | ◯ | ◯ | ◯ |
| Condition (5') | ◯ | ◯ | ◯ |
| Condition (5") | ◯ | X | X |
| 3rd lens unit: at least two meniscus lenses, each with a convex surface directed toward the object side | ◯ | ◯ | ◯ |
| 3rd lens unit: at least three meniscus lenses, each with a convex surface directed toward the object side | ◯ | X | X |

Note:
◯ indicates that conditions are satisfied.
X indicated that conditions are not satisfied.

The image forming optical system of the present invention can be used in the optical device, such as the motion picture film scanner (the telecine device) or a height measuring device. An embodiment in this case is shown below.

FIG. 19 shows an example of the telecine device using the image forming optical system of the present invention. This telecine device has a light source 11 for image projection on a motion picture film, a feed reel 12, a winding reel 13, a motion picture film 14 wound on the winding reel 13 from the feed reel 12, an image forming optical system 15 of the arrangement such as that shown in each embodiment of the present invention, and a CCD camera 16. Also in FIG. 19, a specific arrangement of the image forming optical system 15 is omitted.

In the telecine device, light emitted form the light source 11 is projected on the motion picture film 14, and its transmission light passes through the image forming optical system 15 and is imaged by the CCD camera 16.

In the image forming optical system 15, the magnification can be changed so that the image information of the motion picture film 14 is acquired over the entire imaging area of the CCD camera 16, to the size of the motion picture film, through the image forming optical system 15.

According to this telecine device, the image forming optical system 15 has a bilateral telecentric design, so that even when the imaging magnification is changed, the conjugate length remains unchanged. Consequently, there is no need to adjust the positions of individual members. Since the image-side F-number is maintained with little fluctuation and the loss of the amount of light is kept to a minimum, the adjustment of brightness is not required. Furthermore, a change of magnification on the image plane caused by the disturbance of flatness of the film that the object is photographed can be minimized.

Figure 20:
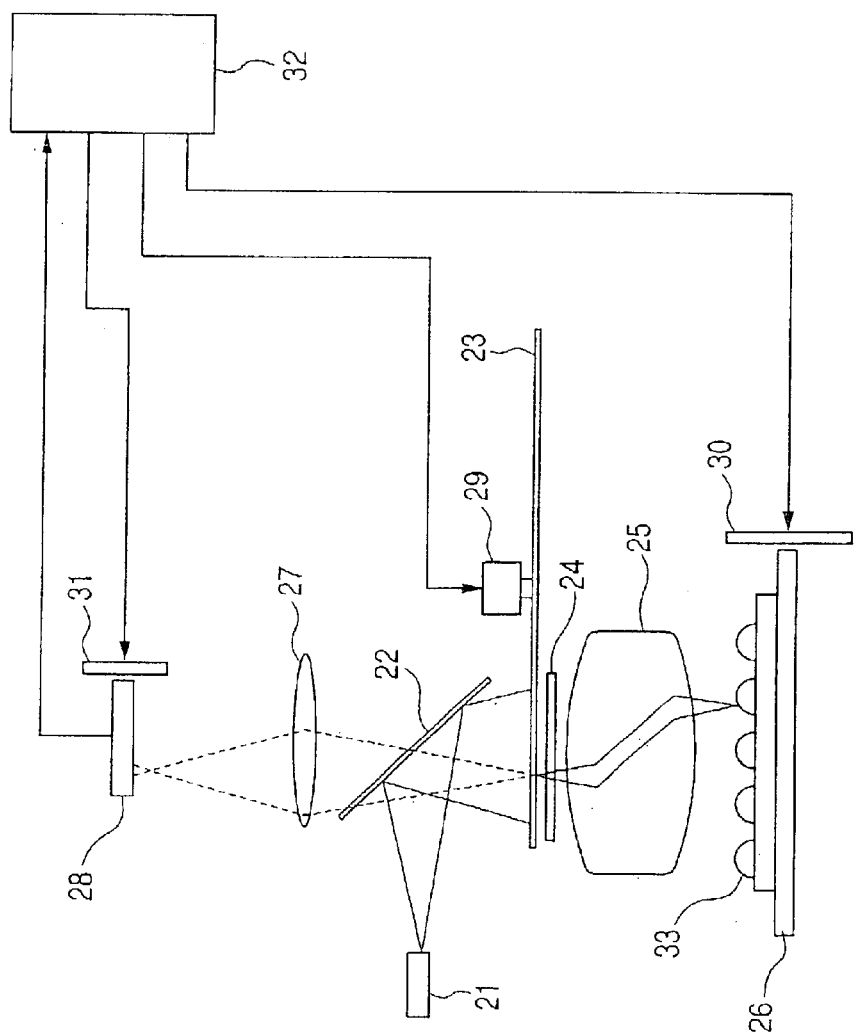
FIG. 20 is a view schematically showing an example of a height measuring device using the image forming optical system of the present invention.

FIG. 20 shows an example of a height measuring device using the image forming optical system of the present invention. In this example, the image forming optical system is used as a confocal optical system.

The height measuring device is constructed with a light source 21, a polarization beam splitter 22, a disk 23 provided with a plurality of pinholes, a quarter-wave plate 24, a confocal optical system 25 constructed in the same way as the image forming optical system in each of the above embodiments of the present invention, an X-Y-Z stage 26, an imaging lens 27, an image sensor 28, a motor 29 driving the disk 23, a stage driving mechanism 30 driving the X-Y-Z stage 26, a sensor driving mechanism 31 driving the image sensor 28, and a computer 32 controlling the drives of the motor 29, the stage driving mechanism 30, and the sensor driving mechanism 31.

In the height measuring device constructed as mentioned above, a linearly polarized component p or s of light emitted from the light source 21 is reflected by the polarization beam splitter 22, passes through the pinhole of the disk 23, suffers a phase shift of 45° through the quarter-wave plate 24, and illuminates a point of a sample 33 on the X-Y-Z stage 26 through the confocal optical system 25. The light reflected from the sample passes through the confocal optical system 25, suffers a phase shift of 45° through the quarter-wave plate 24, passes through the pinhole of the disk 23, is transmitted through the polarization beam splitter 22, and is imaged by the image sensor 28 through the imaging lens 27. The motor 29 is driven through the computer 32, and thereby the entire surface of the sample 33 can be scanned. In this case, by finding the position where the intensity of light of a confocal image of the sample 33 formed by the image sensor 28 is maximized while changing the driving mechanism 30 or 31 in the direction of the optical axis, the height of the sample is detected. Moreover, the magnification of the confocal optical system 25 can be changed in accordance with the size of the sample 33.

In the height measuring device also, the confocal optical system 25 has a bilateral telecentric design, so that even when the imaging magnification is changed, the conjugate length remains unchanged. Consequently, there is no need to adjust the position of individual members. Since the image-side F-number is maintained with little fluctuation and the loss of the amount of light is kept to a minimum, the adjustment of brightness is not required.

What is claimed is:

1. An image forming optical system comprising, in order from an object side toward an image side:

a first lens unit with positive refracting power;

a second lens unit with positive refracting power;

a third lens unit with negative refracting power;

a fourth lens unit with positive refracting power; and an aperture stop interposed between the third lens unit and the fourth lens unit, a variable magnification optical system being provided in which spacings between the first lens unit and the second lens unit, between the second lens unit and the third lens unit, and between the third lens unit and the fourth lens unit are changed to thereby vary an imaging magnification, wherein the image forming optical system changes the imaging magnification while constantly keeping an object-to-image distance thereof, and in at least one variable magnification state where the imaging magnification is changed, satisfies the following conditions:

$$|En|/L>0.4$$

$$|Ex|/|L/\beta|>0.4$$

where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and β is a magnification of a whole of the image forming optical system.

2. An image forming optical system according to claim 1, further satisfying the following conditions:

$$1.0<MAXFNO<8.0$$

$$|\Delta FNO/\Delta\beta|<5$$

where MAXFNO is an object-side F-number which is smallest when the imaging magnification of the image forming optical system is changed, ΔFNO is a difference between the object-side F-number at a minimum magnification of a whole of the image forming optical system and the object-side F-number at a maximum magnification of a whole of the image forming optical system, and Δβ is a difference between the minimum magnification of the whole of the image forming optical system and the maximum magnification of the whole of the image forming optical system.

3. An image forming optical system according to claim 1, further satisfying the following condition:

$$0.6<|(R3f+R3b)/(R3f-R3b)|<5.0$$

where R3f is a radius of curvature of a most object-side surface of the third lens unit and R3b is a radius of curvature of a most image-side surface of the third lens unit.

4. An optical device using an image forming optical system, the image forming optical system comprising, in order from an object side toward an image side:
- a first lens unit with positive refracting power;
- a second lens unit with positive refracting power;
- a third lens unit with negative refracting power;
- a fourth lens unit with positive refracting power; and
- an aperture stop interposed between the third lens unit and the fourth lens unit,
- a variable magnification optical system being provided in which spacings between the first lens unit and the second lens unit, between the second lens unit and the third lens unit, and between the third lens unit and the fourth lens unit are changed to thereby vary an imaging magnification, wherein the image forming optical system changes the imaging magnification while constantly keeping an object-to-image distance thereof, and in at least one variable magnification state where the imaging magnification is changed, satisfies the following conditions:

$$|En|/L>0.4$$

$$|Ex|/|L/\beta|>0.4$$

where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and β is a magnification of a whole of the image forming optical system.

5. An image forming optical system according to claim 1, wherein a most object-side lens of the first lens unit has positive refracting power.

6. An image forming optical system according to claim 1, wherein the first lens unit includes, in order from the object side, a positive lens, a negative lens, and a positive lens.

7. An image forming optical system according to claim 1, further satisfying the following condition:

$$1.2<|(R3f+R3b)/(R3f-R3b)|<3.5$$

where R3f is a radius of curvature of a most object-side surface of the third lens unit and R3b is a radius of curvature of a most image-side surface of the third lens unit.

8. An image forming optical system according to claim 3, further satisfying the following condition:

$$1.2<|(R3f+R3b)/(R3f-R3b)|<3.5.$$

9. An image forming optical system according to claim 5, satisfying the following condition:

$$1.2<|(R3f+R3b)/(R3f-R3b)|<3.5$$

where R3f is a radius of curvature of a most object-side surface of the third lens unit and R3b is a radius of curvature of a most image-side surface of the third lens unit.

10. An image forming optical system according to claim 1, wherein the third lens unit has at least two meniscus lenses, each with a convex surface directed toward the object side.

11. An image forming optical system according to claim 3, wherein the third lens unit has at least two meniscus lenses, each with a convex surface directed toward the object side.

12. An image forming optical system according to claim 5, wherein the third lens unit has at least two meniscus lenses, each with a convex surface directed toward the object side.

13. An image forming optical system according to claim 7, wherein the third lens unit has at least two meniscus lenses, each with a convex surface directed toward the object side.

14. An optical device using an image forming optical system, the image forming optical system comprising, in order from an object side toward an image side:
- a first lens unit with positive refracting power;
- a second lens unit with positive refracting power;
- a third lens unit with negative refracting power;
- a fourth lens unit with positive refracting power; and
- an aperture stop interposed between the third lens unit and the fourth lens unit,
- a variable magnification optical system being provided in which spacings between the first lens unit and the second lens unit, between the second lens unit and the third lens unit, and between the third lens unit and the fourth lens unit are changed to thereby vary an imaging magnification, wherein the image forming optical system changes the imaging magnification while constantly keeping an object-to-image distance thereof, and in at least one variable magnification state where the imaging magnification is changed, satisfies the following conditions:

$|En|/L > 0.4$ $|Ex|/|L/\beta| > 0.4$ where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and $\beta$ is a magnification of a whole of the image forming optical system, and wherein a most object-side lens of the first lens unit has positive refracting power.

15. An optical device using an image forming optical system, the image forming optical system comprising, in order from an object side toward an image side:
   a first lens unit with positive refracting power;
   a second lens unit with positive refracting power;
   a third lens unit with negative refracting power;
   a fourth lens unit with positive refracting power; and
   an aperture stop interposed between the third lens unit and the fourth lens unit,
   a variable magnification optical system being provided in which spacings between the first lens unit and the second lens unit, between the second lens unit and the third lens unit, and between the third lens unit and the fourth lens unit are changed to thereby vary an imaging magnification,
   wherein the image forming optical system changes the imaging magnification while constantly keeping an object-to-image distance thereof, and in at least one variable magnification state where the imaging magnification is changed, satisfies the following conditions:

$|En|/L > 0.4$ $|Ex|/|L/\beta| > 0.4$ where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and $\beta$ is a magnification of a whole of the image forming optical system, and wherein the image forming optical system further satisfies the following condition:

$1.2 < |(R3f+R3b)/(R3f-R3b)| < 3.5$ where R3f is a radius of curvature of a most object-side surface of the third lens unit and R3b is a radius of curvature of a most image-side surface of the third lens unit.

16. An optical device using an image forming optical system, the image forming optical system comprising, in order from an object side toward an image side:
   a first lens unit with positive refracting power;
   a second lens unit with positive refracting power;
   a third lens unit with negative refracting power;
   a fourth lens unit with positive refracting power; and
   an aperture stop interposed between the third lens unit and the fourth lens unit,
   a variable magnification optical system being provided in which spacings between the first lens unit and the second lens unit, between the second lens unit and the third lens unit, and between the third lens unit and the fourth lens unit are changed to thereby vary an imaging magnification,
   wherein the image forming optical system changes the imaging magnification while constantly keeping an object-to-image distance thereof, and in at least one variable magnification state where the imaging magnification is changed, satisfies the following conditions:

$|En|/L > 0.4$ $|Ex|/|L/\beta| > 0.4$ where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and $\beta$ is a magnification of a whole of the image forming optical system, and wherein the third lens unit has at least two meniscus lenses, each with a convex surface directed toward the object side.

17. An optical device using an image forming optical system, the image forming optical system comprising, in order from an object side toward an image side:
   a first lens unit with positive refracting power;
   a second lens unit with positive refracting power;
   a third lens unit with negative refracting power;
   a fourth lens unit with positive refracting power; and
   an aperture stop interposed between the third lens unit and the fourth lens unit,
   a variable magnification optical system being provided in which spacings between the first lens unit and the second lens unit, between the second lens unit and the third lens unit, and between the third lens unit and the fourth lens unit are changed to thereby vary an imaging magnification,
   wherein the image forming optical system changes the imaging magnification while constantly keeping an object-to-image distance thereof, and in at least one variable magnification state where the imaging magnification is changed, satisfies the following conditions:

$|En|/L > 0.4$ $|Ex|/|L/\beta| > 0.4$ where En is a distance from a first lens surface on the object side of the variable magnification optical system to an entrance pupil of the image forming optical system, L is the object-to-image distance of the image forming optical system, Ex is a distance from a last lens surface on the image side of the variable magnification optical system to an exit pupil of the image forming optical system, and $\beta$ is a magnification of a whole of the image forming optical system, and wherein the image forming optical system further satisfies the following condition:

$$1.2 < |(R3f+R3b)/(R3f-R3b)| < 3.5$$

where R3f is a radius of curvature of a most object-side surface of the third lens unit and R3b is a radius of curvature of a most image-side surface of the third lens unit, and the third lens unit has at least two meniscus lenses, each with a convex surface directed toward the object side.

* * * * *